(12) United States Patent
Imaoka et al.

(10) Patent No.: US 11,982,800 B2
(45) Date of Patent: May 14, 2024

(54) OPTICAL SYSTEM, IMAGE PROJECTION APPARATUS, AND IMAGING APPARATUS

(71) Applicant: Panasonic Intellectual Property Management Co., Ltd., Osaka (JP)

(72) Inventors: Takuya Imaoka, Kanagawa (JP); Qinghua Zhao, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 230 days.

(21) Appl. No.: 17/370,196

(22) Filed: Jul. 8, 2021

(65) Prior Publication Data
US 2021/0333526 A1    Oct. 28, 2021

Related U.S. Application Data

(63) Continuation of application No. PCT/JP2019/043706, filed on Nov. 7, 2019.

(30) Foreign Application Priority Data

Jan. 25, 2019  (JP) ................................. 2019-011465

(51) Int. Cl.
G02B 15/14      (2006.01)
G02B 13/00      (2006.01)
G02B 13/18      (2006.01)

(52) U.S. Cl.
CPC .  *G02B 15/145127* (2019.08); *G02B 13/0095* (2013.01); *G02B 13/18* (2013.01)

(58) Field of Classification Search
CPC ........ G02B 15/145127; G02B 13/0095; G02B 13/18; G02B 13/16; G02B 15/14;
(Continued)

(56) References Cited

U.S. PATENT DOCUMENTS 9,041,848 B2    5/2015  Inoko
9,785,043 B2 *  10/2017  Matsuo .............. G02B 17/0896
(Continued)

FOREIGN PATENT DOCUMENTS

JP    2014-29392    2/2014
JP    2015-152890   8/2015
(Continued)

OTHER PUBLICATIONS

Office Action dated May 9, 2022 in Chinese Patent Application No. 201980090000.6, with English-language translation.
(Continued)

*Primary Examiner* — Thomas K Pham
*Assistant Examiner* — Kuei-Jen L Edenfield
(74) *Attorney, Agent, or Firm* — WENDEROTH, LIND & PONACK, L.L.P.

(57) ABSTRACT

An optical system internally has an intermediate imaging position that is conjugated to a magnification conjugate point on a magnification side and a reduction conjugate point on a reduction side, respectively. The optical system includes a magnification optical system having a first lens element and a second lens element positioned on the magnification side with respect to the intermediate imaging position; and a relay optical system having a plurality of lens elements, positioned on the reduction side with respect to the intermediate imaging position. The first lens element and the second lens element are positioned in this order from the magnification side, and the second lens element has a positive power. The optical system satisfies: 23<|f2/fw|<1000, wherein f2 is a focal length of the second lens element, and fw is a focal length of an entirety of the optical system at a wide-angle end.

10 Claims, 17 Drawing Sheets

(58) Field of Classification Search
CPC ........ G02B 13/00; G02B 15/16; G02B 17/08;
G02B 7/02; G02B 7/04; G02B 17/0896;
G02B 7/028; G03B 21/14; G03B 21/00;
G03B 21/53; G03B 21/28; G03B 21/005
USPC ....... 359/794, 676, 683, 736, 434, 443, 507,
359/677, 679, 684, 685, 691, 693, 689
See application file for complete search history.

(56) References Cited

U.S. PATENT DOCUMENTS

| | | |
|---|---|---|
| 2004/0032653 A1 | 2/2004 | Gohman |
| 2008/0198451 A1 | 8/2008 | Gohman et al. |
| 2012/0300296 A1 | 11/2012 | Lin et al. |
| 2014/0036142 A1 | 2/2014 | Inoko |
| 2015/0103403 A1 | 4/2015 | Oe et al. |
| 2015/0234167 A1 | 8/2015 | Ode |
| 2017/0153427 A1 | 6/2017 | Masui |
| 2018/0059519 A1 | 3/2018 | Nagatoshi et al. |
| 2019/0025561 A1 | 1/2019 | Imaoka |
| 2019/0129285 A1* | 5/2019 | Masui .................... G02B 13/22 |

FOREIGN PATENT DOCUMENTS

| | | |
|---|---|---|
| JP | 2016-143032 | 8/2016 |
| JP | 2017-102239 | 6/2017 |
| JP | 2018-36388 | 3/2018 |
| WO | 2017/195857 | 11/2017 |

OTHER PUBLICATIONS

International Search Report dated Jan. 28, 2020 in International (PCT) Application No. PCT/JP2019/043706 with English translation.

Extended European Search Report issued dated Feb. 4, 2022, in European Patent Application No. 19911479.4.

English Translation of the International Preliminary Report on Patentability and Written Opinion of the International Searching Authority dated Jul. 27, 2021 in International (PCT) Application No. PCT/JP2019/043706.

Notice of Reasons for Refusal dated Apr. 18, 2023 in Japanese Patent Application No. 2020-567374, with English-language translation.

* cited by examiner

ововhich are incorporated herein by reference.

OPTICAL SYSTEM, IMAGE PROJECTION APPARATUS, AND IMAGING APPARATUS

CROSS-REFERENCE OF RELATED APPLICATIONS

This application is a continuation of International Patent Application No. PCT/JP2019/043706, filed on Nov. 7, 2019, which claims the benefit of Japanese Patent Application No. 2019-011465, filed on Jan. 25, 2019, the contents all of which are incorporated herein by reference.

TECHNICAL FIELD

The present disclosure relates to an optical system that forms an intermediate image. The present disclosure also relates to an image projection apparatus and an imaging apparatus using such an optical system.

BACKGROUND

JP 2015-152890 A discloses a zoom optical system that utilizes a re-imaging method, with a wide angle of view, high optical performance over the entire zoom range, and easy miniaturization. The zoom optical system is constituted of a first optical system and a second optical system having a zooming function in this order from the magnification conjugate side to the reduction conjugate side. The zoom optical system has an optical function in which a magnification conjugate point on the magnification conjugate side is imaged at an intermediate imaging position between the first optical system and the second optical system, and the image formed at the intermediate imaging position is re-imaged on a reduction conjugate point on the reduction conjugate side.

JP 2018-036388 A discloses a wide-angle, compact and simple zoom lens. The zoom lens forms an intermediate image at a position that is conjugated to a reduction-side image forming plane and the intermediate image is re-imaged on a magnification-side image forming plane, and a first optical system is located on the magnification side with respect to the intermediate imaging position and a second optical system is located on the reduction side thereto. The second optical system includes two moving lens groups that can move while changing the interval in the optical axis direction between the neighboring groups during zooming, and two fixed lens groups fixed to the reduction-side image forming surface during zooming.

SUMMARY

The present disclosure provides an optical system that can reduce the manufacturing cost of a wide-angle zoom lens. The present disclosure also provides an image projection apparatus and an imaging apparatus using such an optical system.

One aspect of the present disclosure is directed to an optical system internally having an intermediate imaging position that is conjugated to a magnification conjugate point on a magnification side and a reduction conjugate point on a reduction side, respectively, the optical system including:
 a magnification optical system having a plurality of lens elements, positioned on the magnification side with respect to the intermediate imaging position; and
 a relay optical system having a plurality of lens elements, positioned on the reduction side with respect to the intermediate imaging position,
 wherein the magnification optical system has a first lens element and a second lens element in this order from the magnification side, and the second lens element has a positive power, and
 the optical system satisfies the following condition (1):

$$23<|f2/fw|<1000 \tag{1}$$

where, f2 is a focal length of the second lens element, and fw is a focal length of the entire optical system at the wide-angle end.

Another aspect of the present disclosure is directed to an optical system internally having an intermediate imaging position that is conjugated to a magnification conjugate point on a magnification side and a reduction conjugate point on a reduction side, respectively, the optical system including:
 a magnification optical system having a plurality of lens elements, positioned on the magnification side with respect to the intermediate imaging position; and
 a relay optical system having a plurality of lens elements, positioned on the reduction side with respect to the intermediate imaging position,
 wherein the magnification optical system includes a front group positioned on the magnification side with respect to an intersection position where a main ray of the most off-axis luminous flux intersects with the optical axis, and a rear group positioned on the reduction side with respect to the intersection position, and
 the optical system includes:
 a spherical lens positioned first from the magnification side of the magnification optical system;
 a first aspherical lens arranged in the front group;
 a second aspherical lens arranged in the rear group; and
 a third aspherical lens arranged in the relay optical system.

Further, an image projection apparatus according to the present disclosure includes the above-described optical system and an image forming element that generates an image to be projected through the optical system onto a screen.

Still further, an imaging apparatus according to the present disclosure includes the above-described optical system and an imaging element that receives an optical image formed by the optical system to convert the optical image into an electrical image signal.

The optical system according to the present disclosure can reduce distortion of a wide-angle lens. Therefore, the load of correction by the aspherical lens is reduced, and the aspherical lens can be manufactured at low cost.

Further, the optical system according to the present disclosure can make an outer diameter of the aspherical lens as small as possible and the number of aspherical lenses as small as possible. Therefore, the manufacturing cost of the wide-angle zoom lens can be reduced.

DESCRIPTION OF EMBODIMENT

Hereinafter, embodiments are described in detail with reference to the drawings as appropriate. However, unnecessarily detailed descriptions may be omitted. For example, detailed descriptions of well-known items or redundant descriptions of substantially the same configurations may be omitted. This is to prevent the following description from being unnecessarily redundant and to facilitate understanding by those skilled in the art.

It should be noted that the applicant provides the accompanying drawings and the following description for those skilled in the art to fully understand the present disclosure, and it is not intended to limit the subject matter described in the claims thereby.

Each example of an optical system according to the present disclosure is described below. In each example, described is an example in which the optical system is used in a projector (an example of an image projection apparatus) that projects onto a screen image light of an original image S obtained by spatially modulating incident light using an image forming element, such as liquid crystal or digital micromirror device (DMD), based on an image signal. In other words, the optical system according to the present disclosure can be used for magnifying the original image S on the image forming element arranged on the reduction side to project the image onto the screen (not shown), which is arranged on an extension line on the magnification side.

Further, the optical system according to the present disclosure can also be used for collecting light emitted from an object located on the extension line on the magnification side to form an optical image of the object on an imaging surface of an imaging element arranged on the reduction side.

First Embodiment

Hereinafter, a first embodiment of the present disclosure is described with reference to FIGS. 1 to 16. Here, a zoom lens system is described as an example of the optical system.

Figure 1:
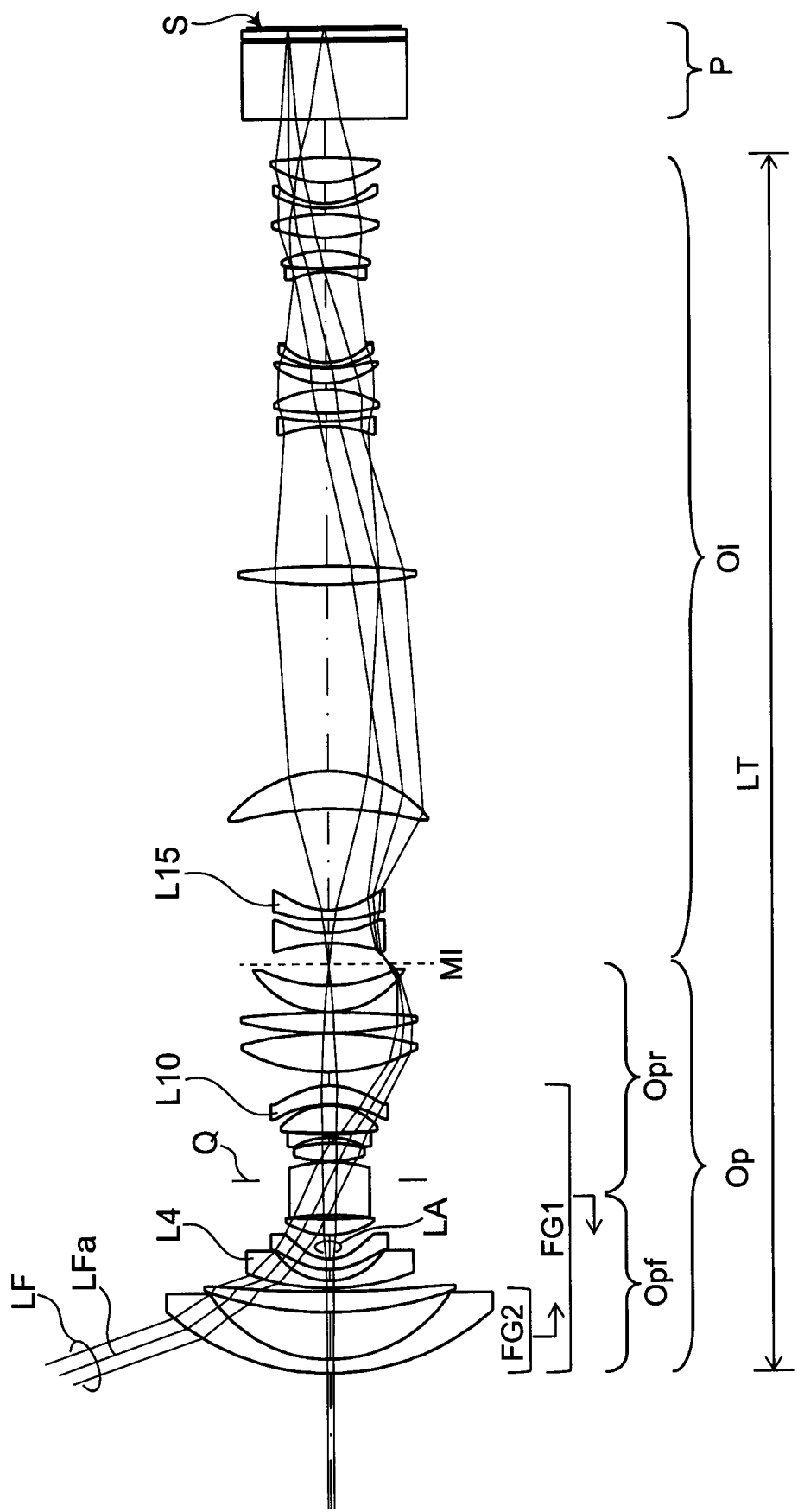
FIG. 1 is a layout diagram showing an optical path at a wide-angle end in a zoom lens system of example 1 for an object distance of 900 mm.
Figure 2:
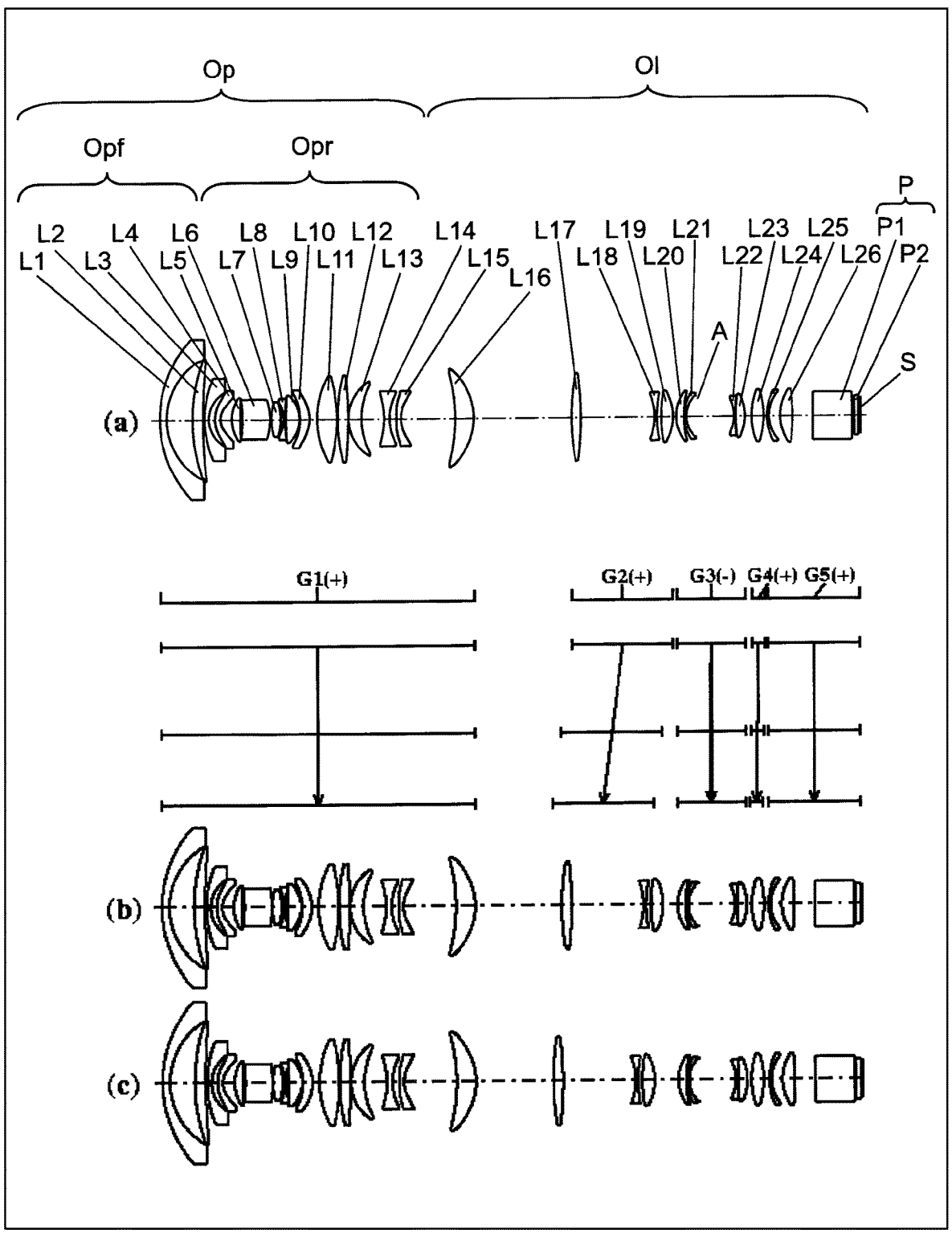
FIG. 2 is a layout diagram of the zoom lens system of example 1 for an object distance of 900 mm.
Figure 6:
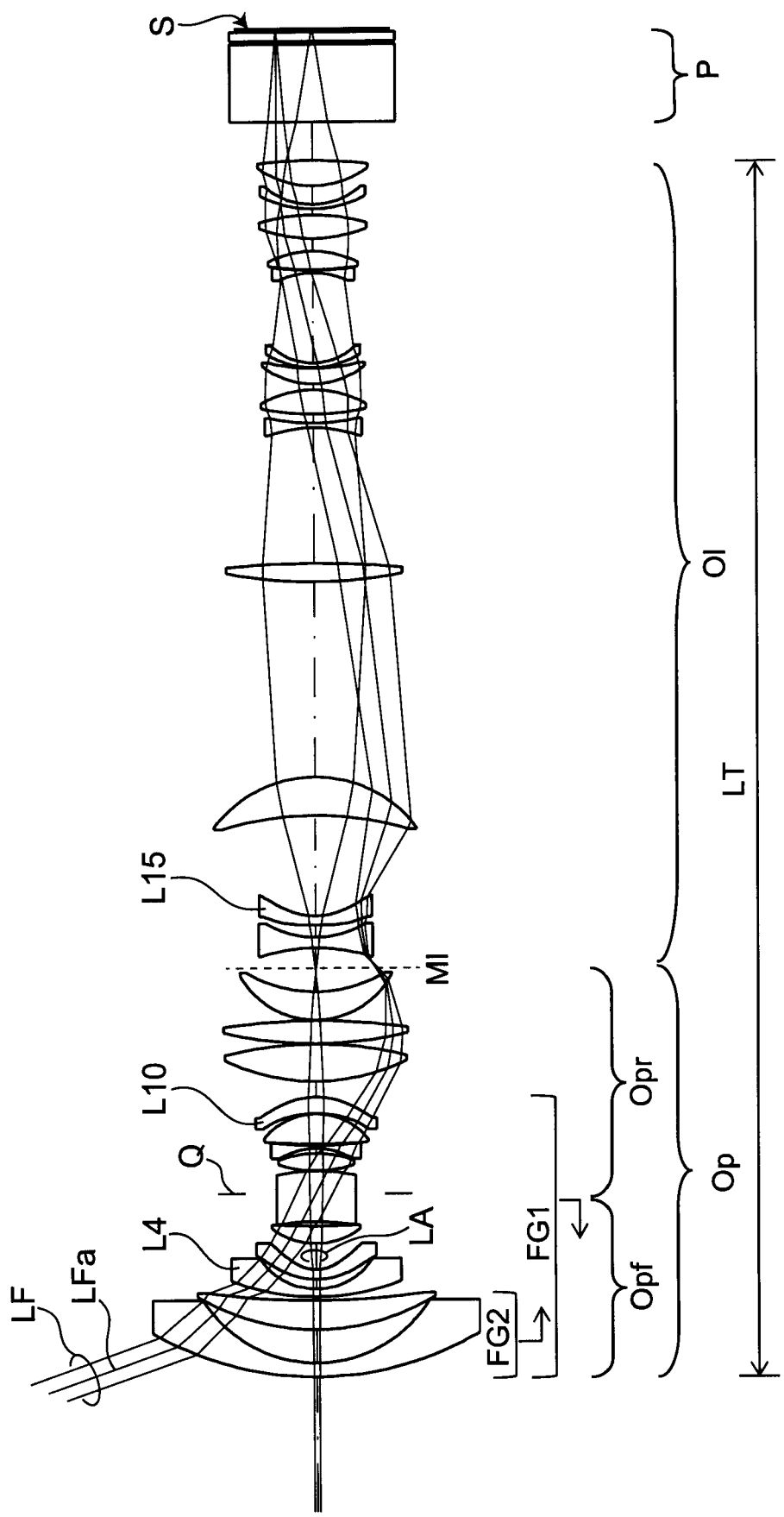
FIG. 6 is a layout diagram showing an optical path at a wide-angle end in a zoom lens system of example 2 for an object distance of 900 mm.
Figure 7:
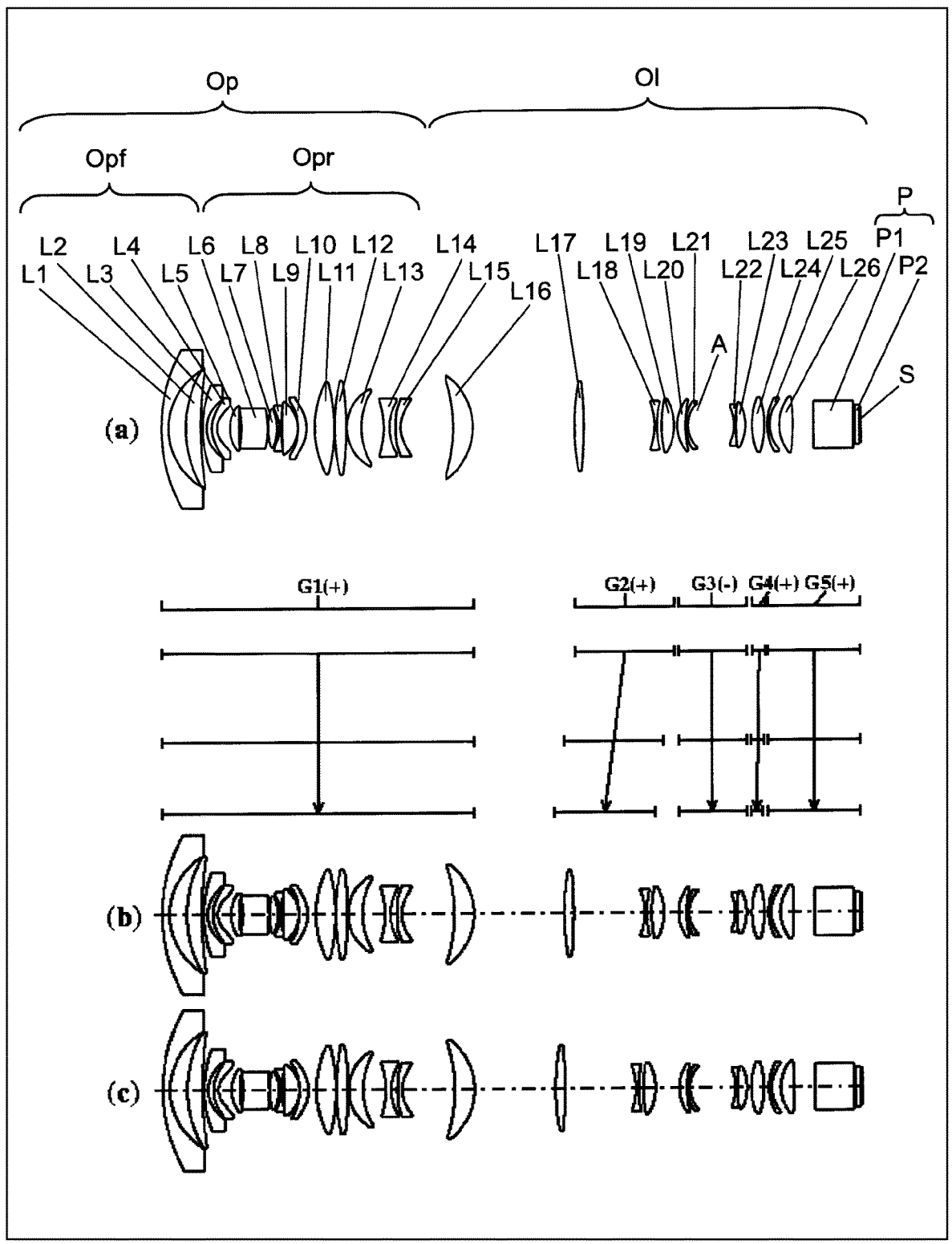
FIG. 7 is a layout diagram of the zoom lens system of example 2 for an object distance of 900 mm.
Figure 11:
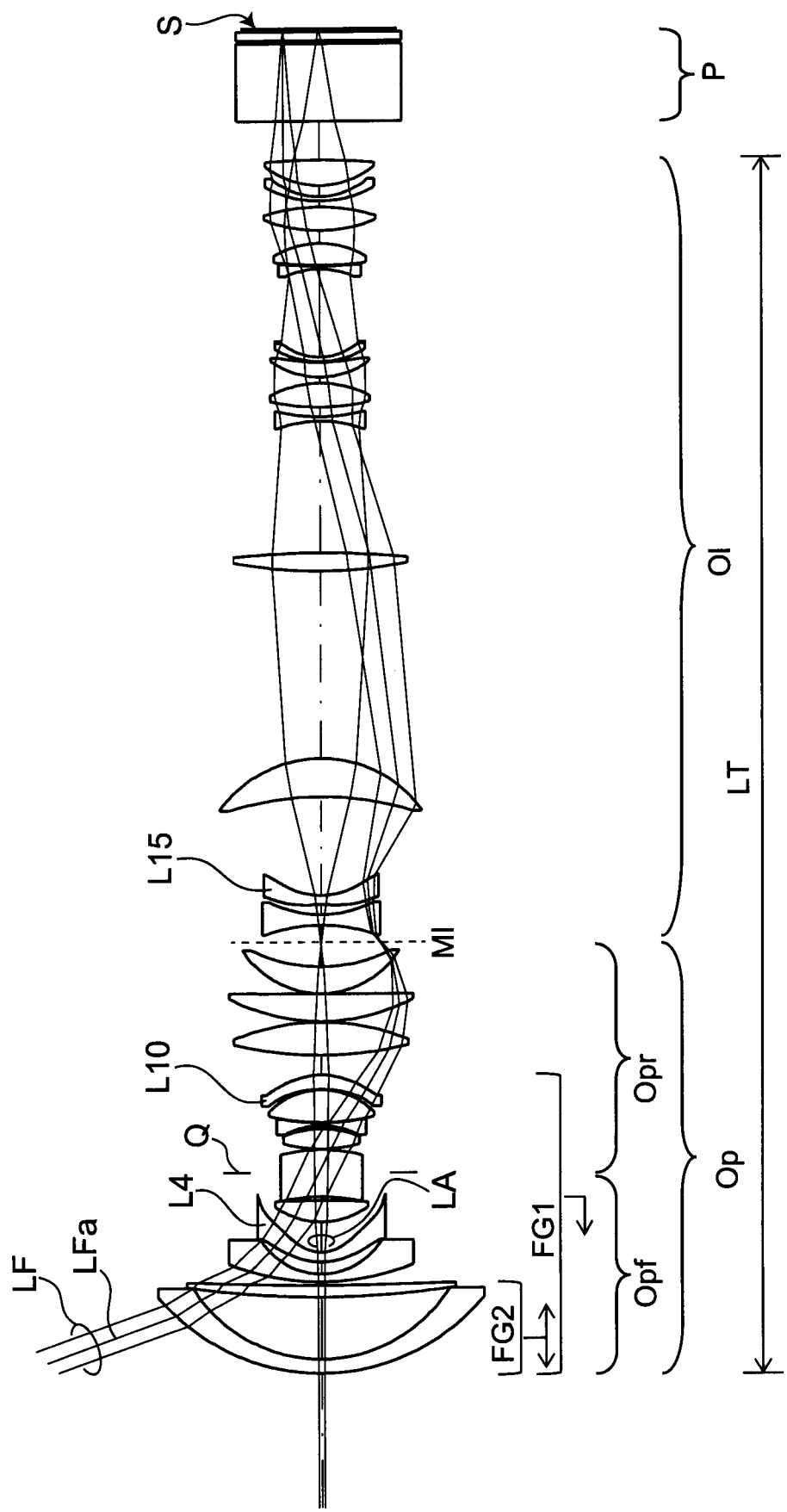
FIG. 11 is a layout diagram showing an optical path at a wide-angle end in a zoom lens system of example 3 for an object distance of 900 mm.
Figure 12:
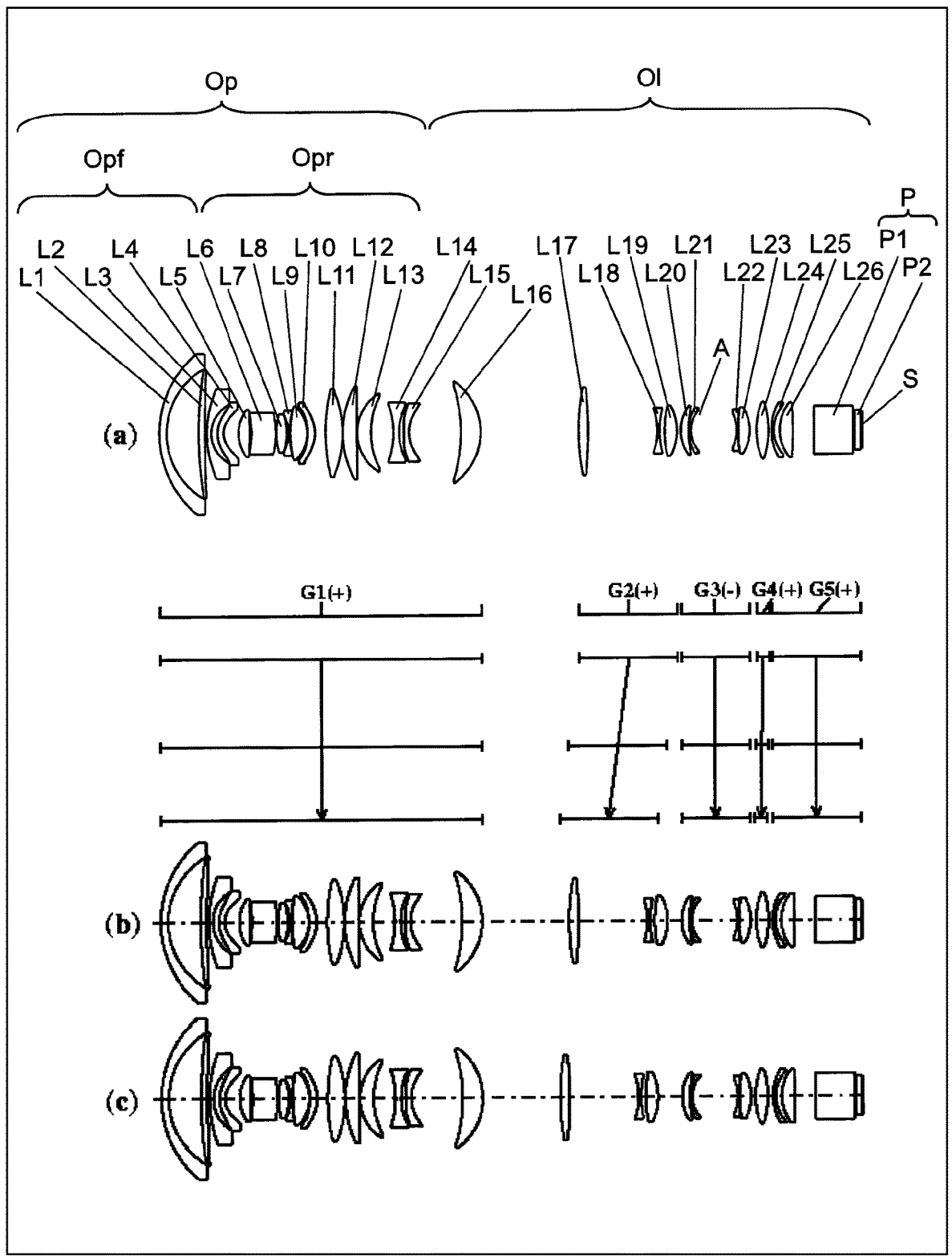
FIG. 12 is a layout diagram of the zoom lens system of example 3 for an object distance of 900 mm.
Figure 16:
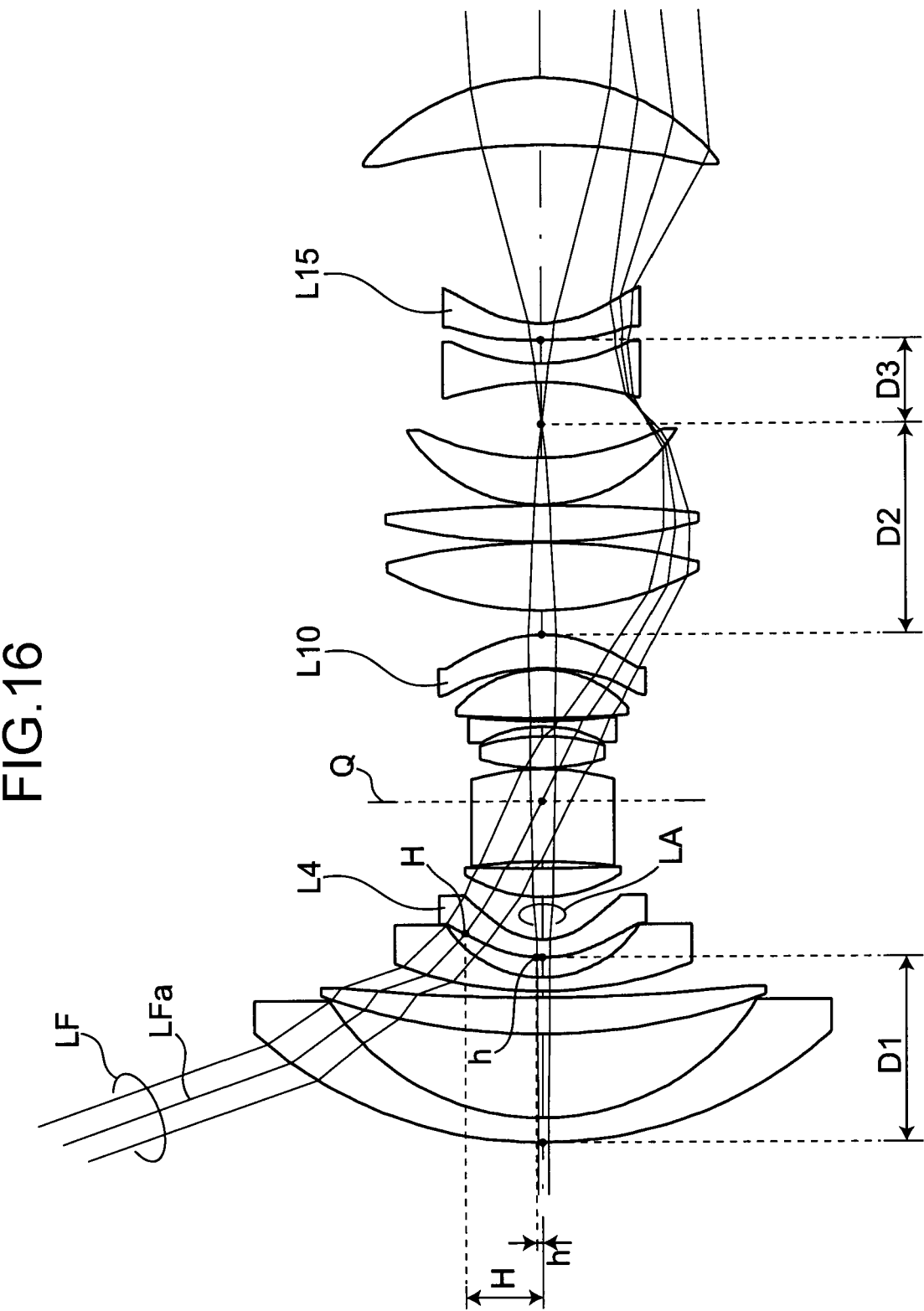
FIG. 16 is a partially enlarged view of the zoom lens system of examples 1 to 3.

FIGS. 1, 6 and 11 are layout diagrams each showing an optical path at a wide-angle end in a zoom lens system according to any of examples 1 to 3 for an object distance of 900 mm. FIGS. 2, 7 and 12 are layout drawings of the zoom lens system according to examples 1 to 3 for an object distance of 900 mm. FIGS. 2(a), 7(a) and 12(a) are lens arrangement diagrams at the wide-angle end in the zoom lens system. FIGS. 2(b), 7(b) and 12(b) are lens arrangement diagrams at an intermediate position in the zoom lens system. FIGS. 2(c), 7(c) and 12(c) are lens arrangement diagrams at a telephoto end in the zoom lens system. FIG. 16 is a partially enlarged view of the zoom lens system according to examples 1 to 3.

The wide-angle end is defined as the shortest focal length state in which the entire optical system has the shortest focal length fw. The intermediate position is defined as an intermediate focal length state between the wide-angle end and the telephoto end. The telephoto end is defined as the longest focal length state in which the entire optical system has the longest focal length ft. By using the focal length fw at the wide-angle end and the focal length ft at the telephoto end, the focal length fm at the intermediate position can be defined as fm=√(fw×ft) (√: square root).

The zoom lens system according to examples 1 to 3 includes a first lens group G1 to a fifth lens group G5. The first lens group G1 is constituted of a first lens element L1 to a 16th lens element L16, including a surface 1 to a surface 32 (see the numerical examples described later). The second lens group G2 is constituted of a 17th lens element L17 to a 19th lens element L19, including a surface 33 to a surface 38. The third lens group G3 is constituted of a 20th lens element L20 to a 23rd lens element L23, including a surface 39 to a surface 47. The fourth lens group G4 is constituted of a 24th lens element L24, including a surface 48 to a surface 49. The fifth lens group G5 is constituted of a 25th lens element L25, a 26th lens element L26, and optical elements P1 and P2, including a surface 50 to a surface 57.

Polygonal line arrows shown between each of FIGS. 2(a), 7(a) and 12(a) and each of FIGS. 2(b), 7(b) and 12(b) include straight lines obtained by connecting the positions of the first lens group G1 to the fifth lens group G5 corresponding to each of the states of the wide-angle end, the intermediate position, and the telephoto end ranked in order from the top in the drawing. The wide-angle end and the intermediate position, and the intermediate position and the telephoto end are simply connected by a straight line, which is different from the actual movement of each of the lens groups G1 to G5. The symbols (+) and (−) attached to the reference numerals of the respective lens groups G1 to G5 indicate the positive or negative power of each of the lens groups G1 to G5.

Further, in FIGS. 1, 6 and 11, the zoom lens system includes a focusing adjustment lens group FG1 that adjusts the focus when an object distance is changed, and a field curvature correction lens group FG2 that corrects the field curvature aberration after focus adjustment by the focusing adjustment lens group FG1. The focusing adjustment lens group FG1 is constituted of, in order from the magnification side to the reduction side, the first lens element L1 to the tenth lens element L10, and the field curvature correction lens group FG2 is constituted of the first lens element L1 and the second lens element L2. During focusing, the focusing adjustment lens group FG1 can move along the optical axis. The focusing adjustment lens group FG1 moves toward the magnification side when a projection distance is changed from the far side to the near side. During correcting of the field curvature aberration at a magnification conjugate point on the magnification side, the field curvature correction lens group FG2 can move along the optical axis. The field curvature correction lens group FG2 in FIGS. 1 and 6 moves toward the reduction side when the projection distance is changed from the far side to the near side. The field curvature correction lens group FG2 in FIG. 11 moves toward the magnification side and the reduction side when the projection distance is changed from the far side to the near side.

In each of the drawings, an imaging position on the magnification side (i.e., the magnification conjugate point) is located on the left side, and an imaging position on the reduction side (i.e., the reduction conjugate point) is located on the right side. Further, in each of the drawings, the straight line drawn closest to the reduction side represents a position of the original image S, and an optical element P is located on the magnification side of the original image S. The optical element P represents different optical elements, such as a prism for color separation and color synthesis, an optical filter, a flat-parallel glass plate, a crystal low-pass filter, and an infrared cut filter.

The zoom lens system according to the examples 1 to 3 internally has an intermediate imaging position MI that is conjugated to the magnification conjugate point on the magnification side and the reduction conjugate point on the reduction side, respectively. Further, in each of the drawings, a magnification optical system Op is positioned on the magnification side with respect to the intermediate imaging position MI, and a relay optical system O1 is positioned on the reduction side with respect to the intermediate imaging position MI.

The magnification optical system Op includes a front group Opf positioned on the magnification side with respect to an intersection position Q where a main ray of the most off-axis luminous flux intersects with the optical axis, and a rear group Opr positioned on the reduction side with respect to the intersection position Q. The front group Opf and the rear group Opr may have a single or a plurality of lens elements. In a case the intersection position Q is present inside the lens element, one surface of the lens element belongs to the front group Opf, and the other surface of the lens element belongs to the rear group Opr.

Figure 3:
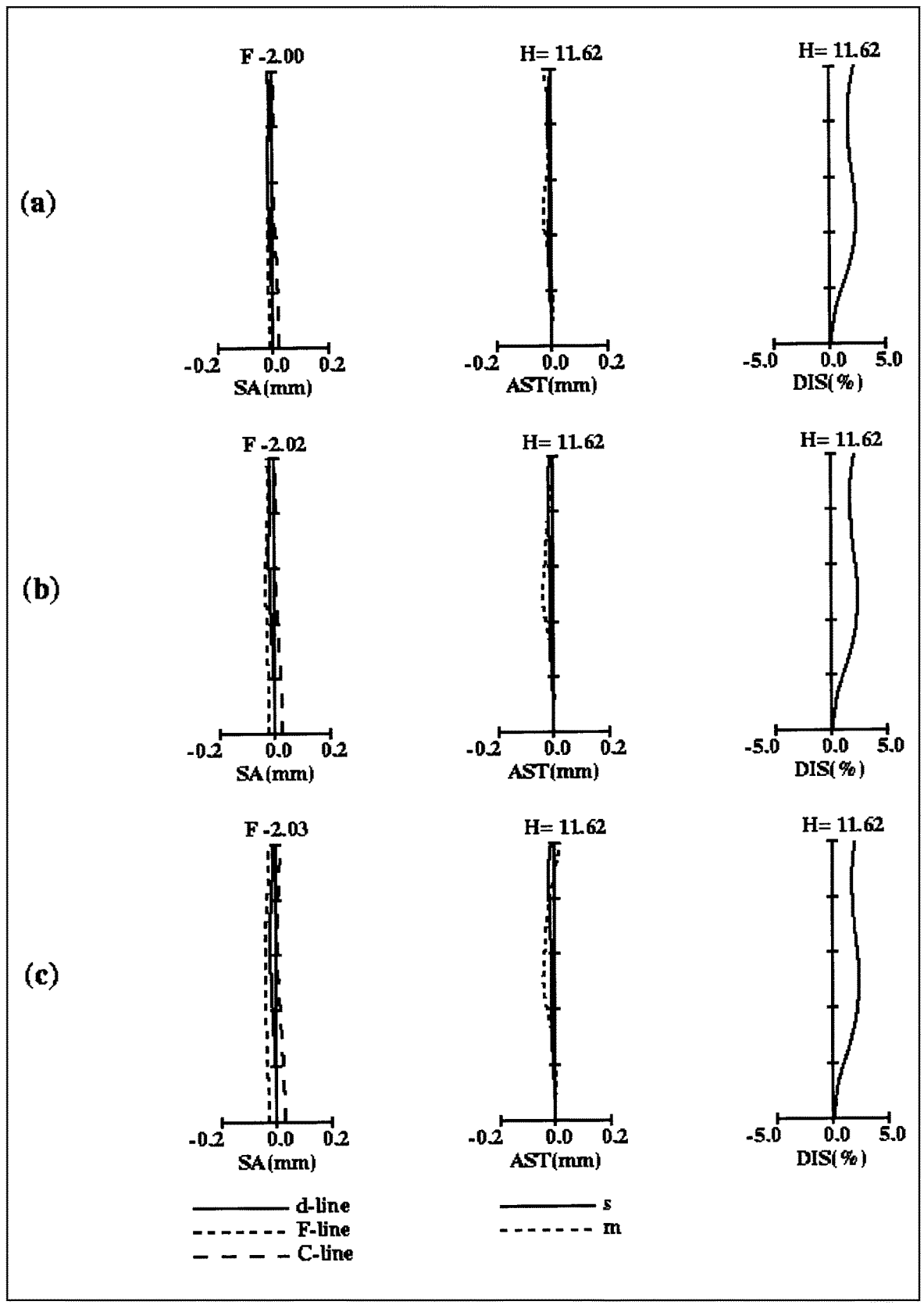
FIG. 3 is a longitudinal aberration diagram of the zoom lens system of example 1 for an object distance of 900 mm.
Figure 4:
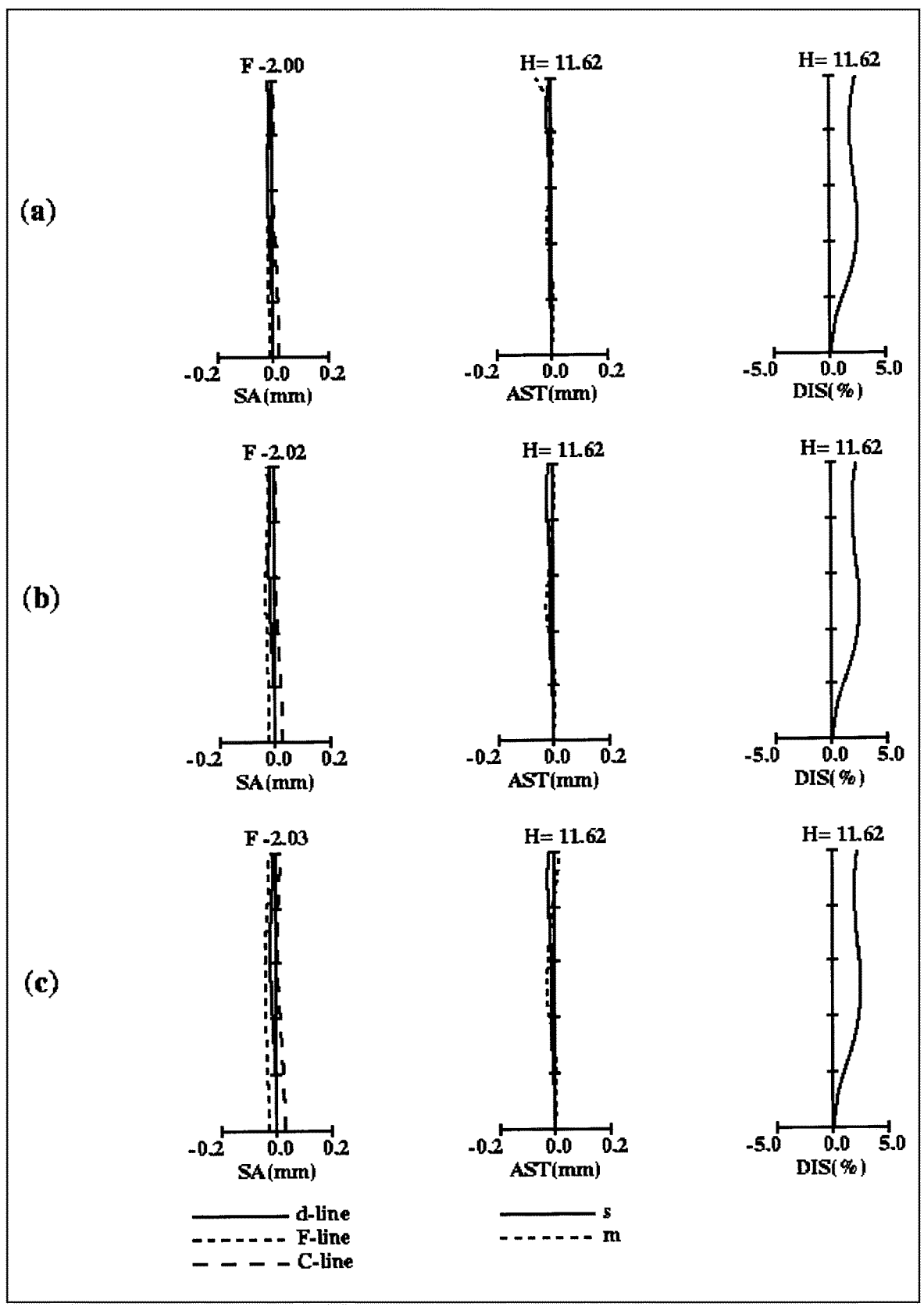
FIG. 4 is a longitudinal aberration diagram of the zoom lens system of example 1 for an object distance of 600 mm.
Figure 5:
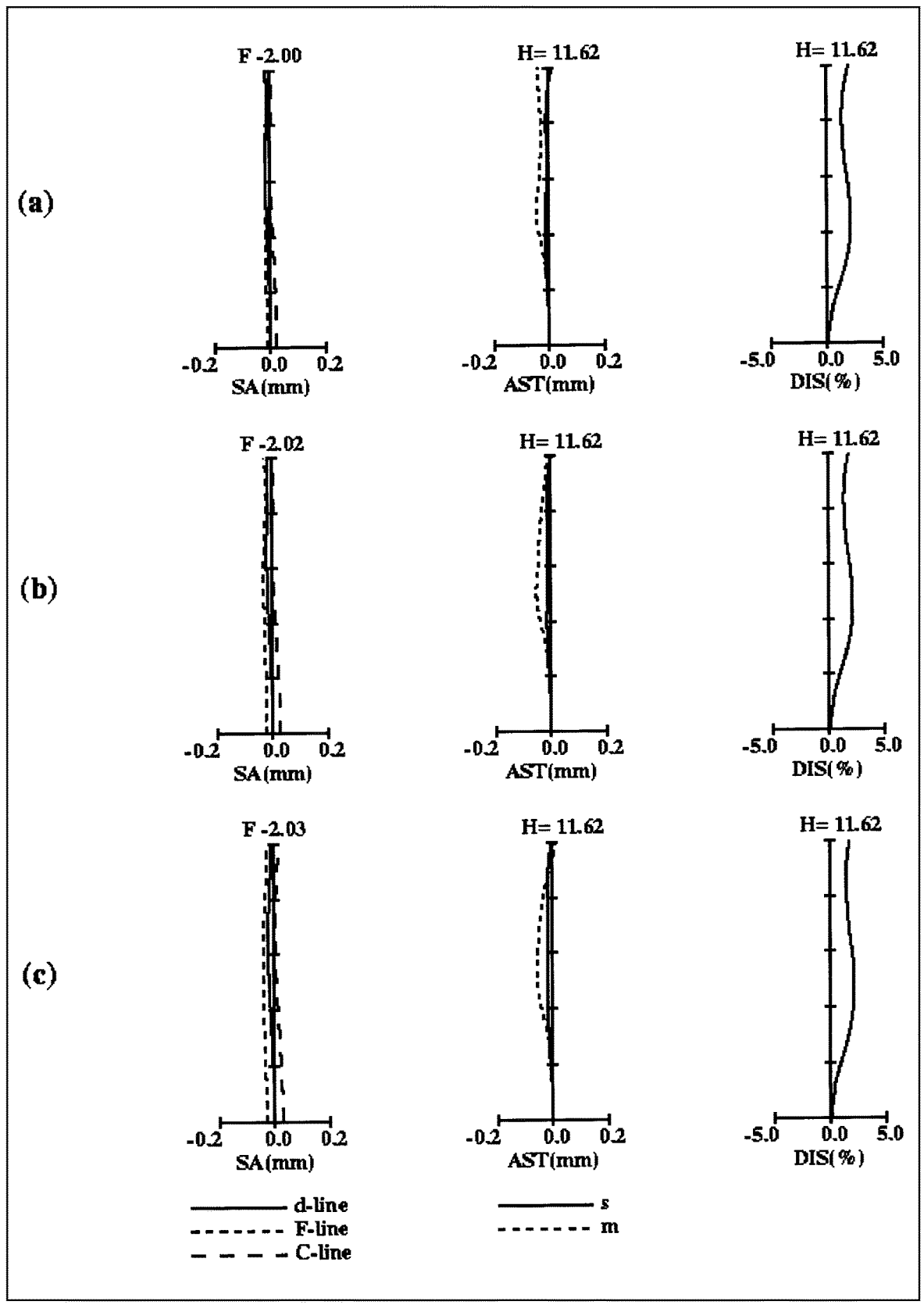
FIG. 5 is a longitudinal aberration diagram of the zoom lens system of example 1 for an object distance of 2400 mm.
Figure 8:
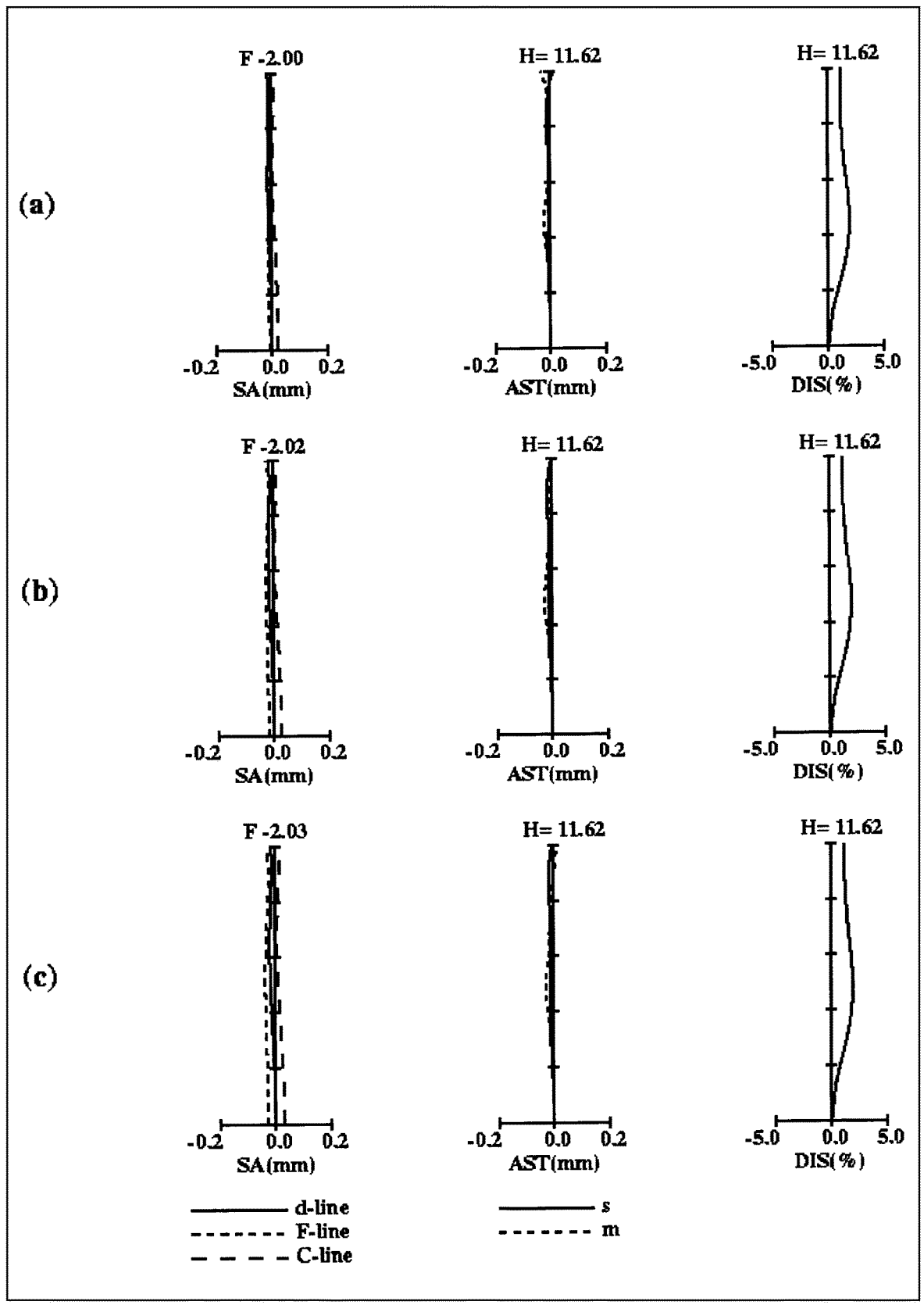
FIG. 8 is a longitudinal aberration diagram of the zoom lens system of example 2 for an object distance of 900 mm.
Figure 9:
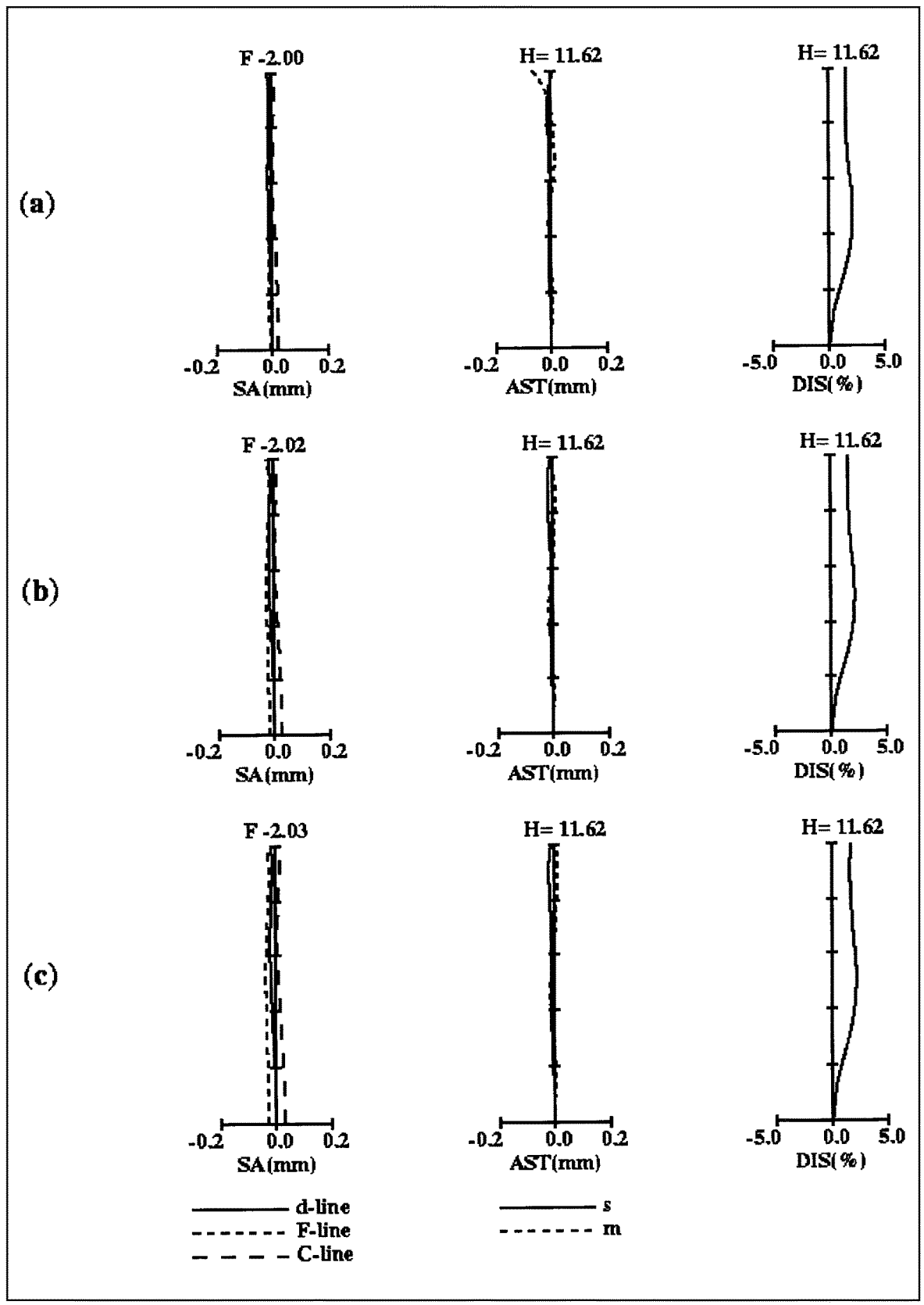
FIG. 9 is a longitudinal aberration diagram of the zoom lens system of example 2 for an object distance of 600 mm.
Figure 10:
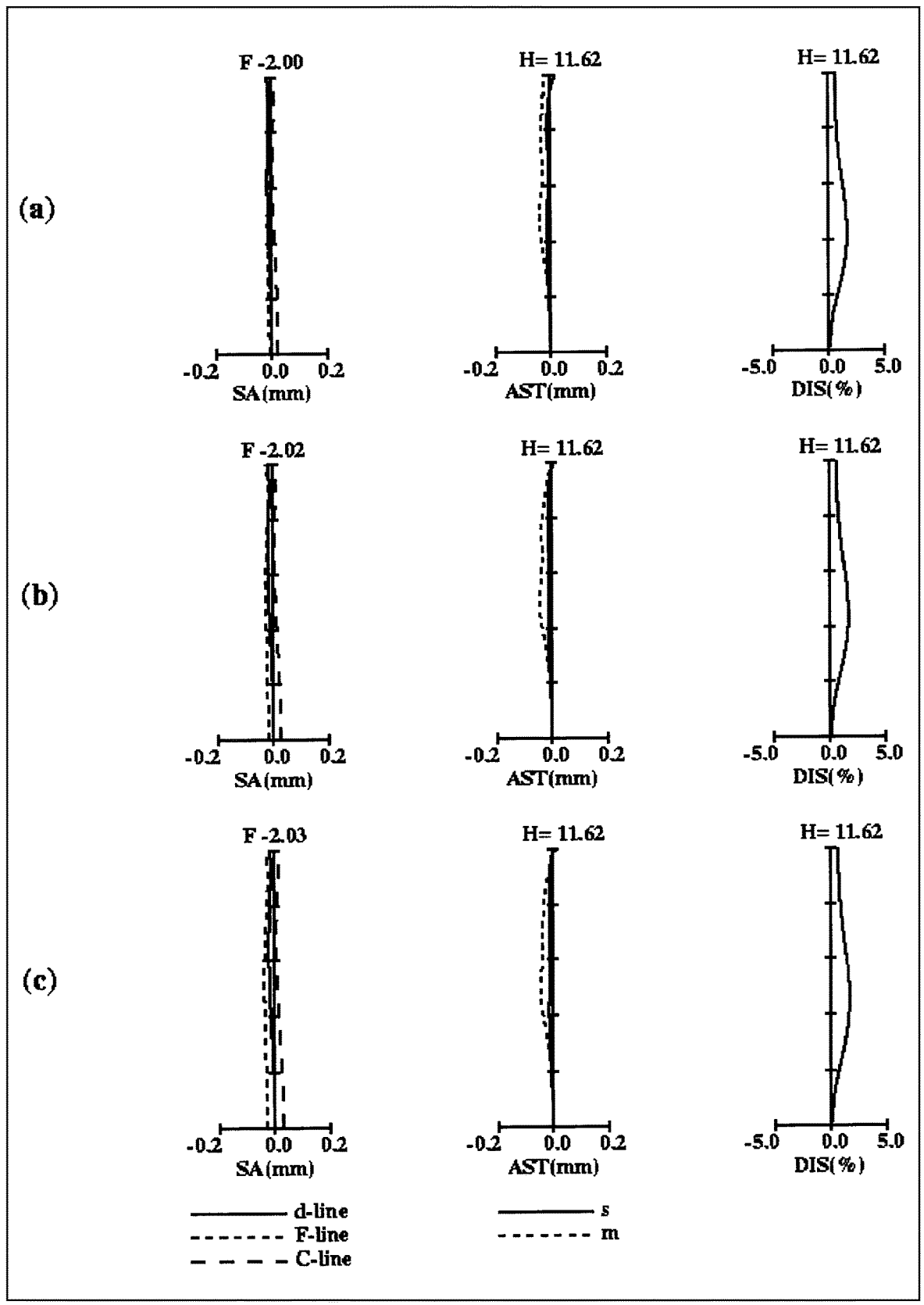
FIG. 10 is a longitudinal aberration diagram of the zoom lens system of example 2 for an object distance of 2400 mm.
Figure 13:
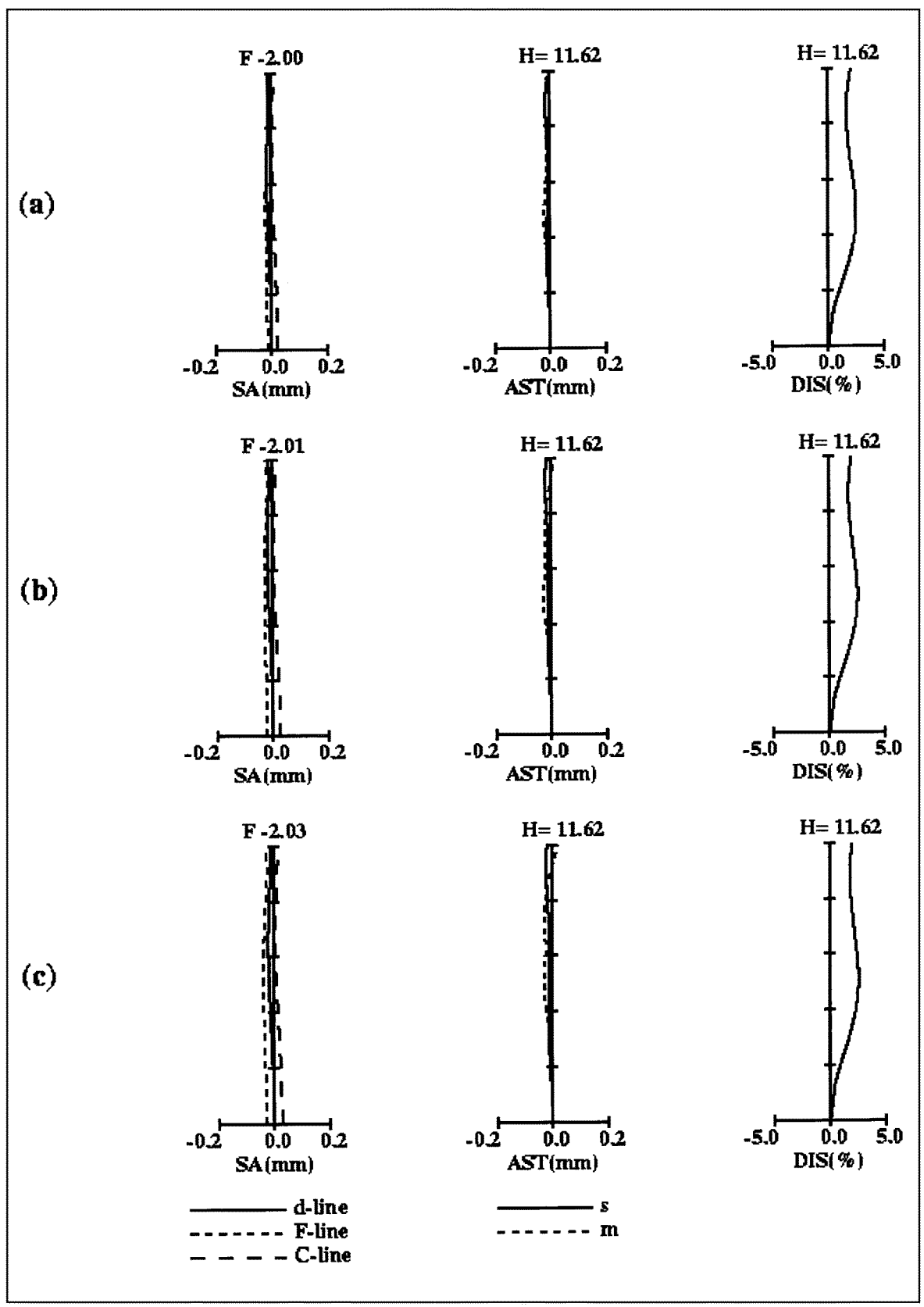
FIG. 13 is a longitudinal aberration diagram of the zoom lens system of example 3 for an object distance of 900 mm.
Figure 14:
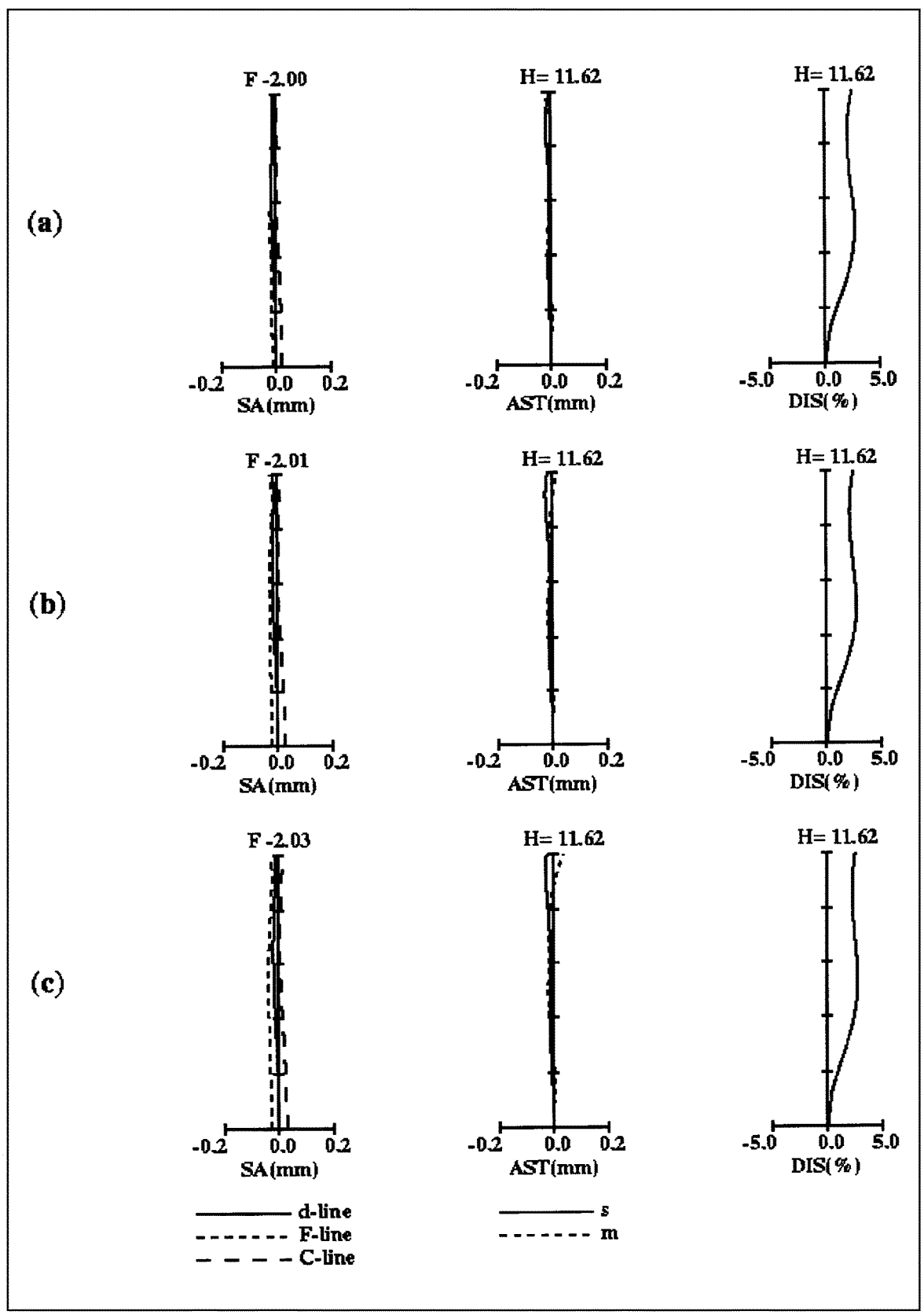
FIG. 14 is a longitudinal aberration diagram of the zoom lens system of example 3 for an object distance of 600 mm.
Figure 15:
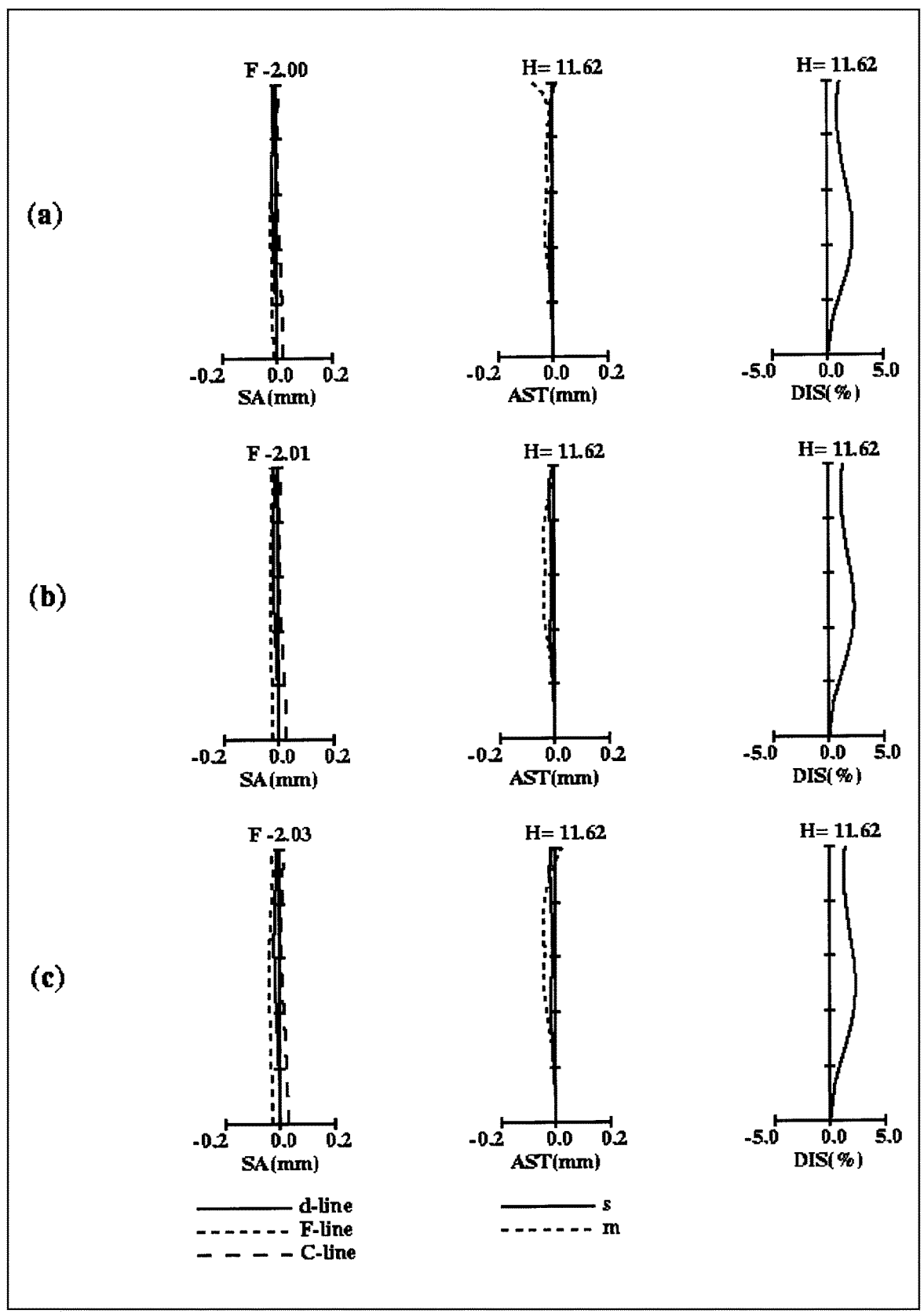
FIG. 15 is a longitudinal aberration diagram of the zoom lens system of example 3 for an object distance of 2400 mm.

FIGS. 3, 8 and 13 are longitudinal aberration diagrams of the zoom lens system according to examples 1 to 3 for an object distance of 900 mm. FIGS. 4, 9 and 14 are longitudinal aberration diagrams of the zoom lens system according to examples 1 to 3 for an object distance of 600 mm. FIGS. 5, 10 and 15 are longitudinal aberration diagrams of the zoom lens according to examples 1 to 3 for an object distance of 2400 mm. FIGS. 3(a) to 5(a), 8(a) to 10(a), 13(a) to 15(a) show longitudinal aberration diagrams at the wide-angle end of the zoom lens system, and FIGS. 3(b) to 5(b), 8(b) to 10(b), 13(b) to 15(b) show longitudinal aberration diagrams at the intermediate position, and FIGS. 3(c) to 5(c), 8 (c) to 10(c), 13(c) to 15(c) show longitudinal aberration diagrams at the telephoto end.

Each of the longitudinal aberration diagrams shows spherical aberration (SA (mm)), astigmatism (AST (mm)), and distortion (DIS (%)) in order from the left side. In the spherical aberration diagram, the vertical axis represents an F number (indicated by F in the drawing), and a solid line shows the characteristic of the d-line, a short dashed line shows the characteristic of the F-line, and a long dashed line shows the characteristic of the C-line. In the astigmatism diagram, the vertical axis represents an image height, and a solid line shows the characteristic of the sagittal plane (indicated by s in the drawing), and a dashed line shows the characteristic of the meridional plane (indicated by m in the drawing). In the distortion diagram, the vertical axis represents the image height. The distortion represents distortion with respect to equidistant projection.

Examples 1 to 3

As shown in FIGS. 1, 2, 6, 7, 11 and 12, the zoom lens system according to examples 1 to 3 includes the magnification optical system Op and the relay optical system O1. The magnification optical system Op is constituted of the first lens element L1 to the 13th lens element L13. The magnification optical system Op is composed of the front group Opf and the rear group Opr.

The front group Opf of the magnification optical system Op is constituted of the first lens element L1 to the fifth lens element L5, and the magnification side surface of the sixth lens element L6 in order from the magnification side to the reduction side. The first lens element L1 has a negative meniscus shape with the convex surfaces facing the magnification side. The second lens element L2 has a positive meniscus shape with the convex surfaces facing the magnification side. The third lens element L3 has a negative meniscus shape with the convex surfaces facing the magnification side. The fourth lens element L4 has a negative meniscus shape with the convex surfaces facing the magnification side. The fifth lens element L5 has a positive meniscus shape with the convex surfaces facing the magnification side. The sixth lens element L6 has a positive meniscus shape with the convex surfaces facing the reduction side.

The rear group Opr of the magnification optical system Op is constituted of the reduction side surface of the sixth lens element L6 and the seventh lens element L7 to the 13th lens element L13 in this order from the magnification side to the reduction side. The seventh lens element L7 has a biconvex shape. The eighth lens element L8 has a biconcave shape. The ninth lens element L9 has a biconvex shape. The 10th lens element L10 has a positive meniscus shape with the convex surfaces facing the reduction side. The 11th lens element L11 has a biconvex shape. The 12th lens element L12 has a biconvex shape in examples 1 and 2, and has a positive meniscus shape with the convex surfaces facing the magnification side in example 3. The 13th lens element L13 has a positive meniscus shape with the convex surfaces facing the magnification side.

In the magnification optical system Op, the first lens element L1 and the second lens element L2 constitute the field curvature correction lens group that moves along the optical axis during correcting the field curvature aberration. The first lens element L1 to the tenth lens element L10 constitute the focusing adjustment lens group that moves along the optical axis during adjusting the focusing.

The relay optical system O1 is constituted of the 14th lens element L14 to the 26th lens element L26 in order from the magnification side to the reduction side. The 14th lens element L14 has a biconcave shape. The 15th lens element L15 has a negative meniscus shape with the convex surfaces facing the magnification side. The 16th lens element L16 has a positive meniscus shape with the convex surfaces facing the reduction side. The 17th lens element L17 has a biconvex shape. The 18th lens element L18 has a biconcave shape. The 19th lens element L19 has a biconvex shape. The 20th lens element L20 has a positive meniscus shape with the convex surfaces facing the magnification side. The 21st lens element L21 has a negative meniscus shape with the convex surfaces facing the magnification side. The 22nd lens element L22 has a biconcave shape. The 23rd lens element L23 has a biconvex shape. The 24th lens element L24 has a biconvex shape. The 25th lens element L25 has a negative meniscus shape with the convex surfaces facing the magnification side. The 26th lens element L26 has a biconvex shape.

By way of example, the fourth lens element L4 corresponds to the first aspherical lens according to the claim, the 10th lens element L10 corresponds to the second aspherical lens according to the claim, and the 15th lens element L15 corresponds to the third aspherical lens according to the claim.

The intermediate imaging position MI is located between the 13th lens element L13 and the 14th lens element L14. Further, an aperture A is arranged between the 21st lens element L21 and the 22nd lens element L22. The optical elements P1 and P2 having zero optical power are arranged on the reduction side of the relay optical system O1, and these optical elements correspond to the optical element P.

The zoom lens system according to examples 1 to 3 may include not only lens elements having an optical power but also elements having zero or substantially zero optical power, such as mirrors, apertures, masks, cover glasses, filters, prisms, wave plates, and polarizing elements.

The zoom lens system according to the examples 1 to 3 internally has an intermediate imaging position MI that is conjugated to the magnification conjugate point on the magnification side and the reduction conjugate point on the reduction side, respectively. Further, the zoom lens system according to examples 1 to 3 includes the magnification optical system Op constituted of the plurality of lens elements, positioned on the magnification side with respect to the intermediate imaging position MI, and the relay optical system O1 constituted of the plurality of lens elements, positioned on the reduction side with respect to the intermediate imaging position MI. In a case the intermediate imaging position MI is located inside a lens element, the lens group located on the magnification side of that lens element belongs to the magnification optical system Op, and the lens group located on the reduction side of the lens element located at the intermediate imaging position belongs to the relay optical system O1. When forming an intermediate image of the original image by means of the relay optical system O1, it becomes easy to correct various aberrations, in particular, chromatic aberration of magnification and the like.

In the zoom lens system according to examples 1 to 3, the magnification optical system Op includes the front group Opf positioned on the magnification side with respect to the intersection position Q where the main ray of the most off-axis luminous flux intersects with the optical axis, and the rear group Opr positioned on the reduction side with respect to the intersection position Q. As a result, the light rays incident on the lens on the magnification side can enter an incident surface and an emitting surface without being too obliquely incident, and the loss of the amount of light due to reflection can be reduced and the field curvature aberration can be suppressed.

Next, conditions which the zoom lens system according to examples 1 to 3 can satisfy are described below. Although a plurality of the conditions are defined for the zoom lens system according to each of the examples, all of these plurality of conditions may be satisfied, or the individual conditions may be satisfied to obtain the corresponding effects.

The zoom lens system according to examples 1 to 3 may be an optical system internally having the intermediate imaging position MI that is conjugated to the magnification conjugate point on the magnification side and the reduction conjugate point on the reduction side, respectively, the optical system may include:
- the magnification optical system Op having the plurality of lens elements, positioned on the magnification side with respect to the intermediate imaging position MI; and
- the relay optical system O1 having the plurality of lens elements, positioned on the reduction side with respect to the intermediate imaging position MI,
- wherein the magnification optical system may have the first lens element L1 and the second lens element L2 in this order from the magnification side, and the second lens element L2 may have a positive power, and
- the optical system satisfies the following condition (1):

$$23 < |f2/fw| < 1000 \tag{1}$$

where, f2 is a focal length of the second lens element L2, and fw is a focal length of the entire optical system at the wide-angle end.

The condition (1) is a conditional expression for defining the relationship between the focal length of the second lens element L2 and the focal length of the entire optical system at the wide-angle end. When satisfying this condition, a lens system having a wide angle and a small lens diameter can be realized. If exceeding the upper limit of the condition (1), the distortion correction becomes insufficient and good image quality cannot be obtained. On the other hand, if falling below the lower limit, the lens becomes difficult to manufacture.

In addition to the condition (1), more advantageous effects can be obtained by further satisfying at least one of the following conditions (1A) and (1B):

$$|f2/fw| > 25 \tag{1A}$$

$$|f2/fw| < 400 \tag{1B}$$

Further, the zoom lens system according to examples 1 to 3 may satisfy the following condition (2):

$$0 < |f1/f2| < 1 \tag{2}$$

where, f1 is a focal length of the first lens element.

The condition (2) is a conditional expression for defining the relationship between the focal length of the first lens element and the focal length of the second lens element. When satisfying this condition, appropriate distortion correction can be realized. If exceeding the upper limit of the condition (2), the distortion correction becomes insufficient and good image quality cannot be obtained. On the other hand, if falling below the lower limit, the field curvature occurs and good image quality cannot be obtained.

In addition to the condition (2), more advantageous effects can be obtained by further satisfying at least one of the following conditions (2A) and (2B):

$$|f1/f2| > 0.1 \tag{2A}$$

$$|f1/f2| < 0.8 \tag{2B}$$

Further, the zoom lens system according to examples 1 to 3 may be an optical system internally having the intermediate imaging position MI that is conjugated to the magnification conjugate point on the magnification side and the reduction conjugate point on the reduction side, respectively, the optical system may include:

the magnification optical system Op having the plurality of lens elements, positioned on the magnification side with respect to the intermediate imaging position MI; and a relay optical system O1 having the plurality of lens elements, positioned on the reduction side with respect to the intermediate imaging position MI, wherein the magnification optical system Op may include the front group Opf positioned on the magnification side with respect to the intersection position Q where the main ray of the most off-axis luminous flux intersects with the optical axis, and the rear group Opr positioned on the reduction side with respect to the intersection position Q, and the optical system may include:

the spherical lens L1 positioned first from the magnification side of the magnification optical system;

the first aspherical lens arranged in the front group Opf;

the second aspherical lens arranged in the rear group Opr; and the third aspherical lens arranged in the relay optical system O1.

The above-described configuration can make the outer diameter of the aspherical lens as small as possible and the number of aspherical lenses as small as possible. Therefore, the manufacturing cost of the zoom lens system can be reduced.

Further, the zoom lens system according to examples 1 to 3 may satisfy the following conditions (3), (4) and (5):

$$0.04<D1/LT<0.15 \quad (3)$$

$$0.04<D2/LT<0.15 \quad (4)$$

$$0.01<D3/LT<0.20 \quad (5)$$

where, as shown in FIGS. 1 and 16, LT is a distance from a surface on the magnification side of the spherical lens to a surface on the reduction side of the lens element which is positioned first from the reduction side, D1 is a distance from a surface on the magnification side of the spherical lens to a surface on the magnification side of the first aspherical lens, D2 is a distance from the intermediate imaging position MI to a surface on the reduction side of the second aspherical lens, and D3 is a distance from the intermediate imaging position MI to a surface on the magnification side of the third aspherical lens.

The condition (3) is a conditional expression for defining the relationship between the distance from a surface closest to the magnification side to a surface on the magnification side of the first aspherical lens and the distance from the surface closest to the magnification side to the surface closest to the reduction side. When satisfying this condition, appropriate distortion correction can be realized and the size of the first aspherical lens can be reduced. If exceeding the upper limit, the distortion correction becomes insufficient and good image quality cannot be obtained. On the other hand, if falling below the lower limit, the first aspherical lens becomes large and the manufacturing cost increases.

The condition (4) is a conditional expression for defining the relationship between the distance from the intermediate imaging position to a surface on the reduction side of the second aspherical lens and the distance from the surface closest to the magnification side to the surface closest to the reduction side. When satisfying this condition, appropriate distortion correction can be realized and the size of the second aspherical lens can be reduced. If exceeding the upper limit, the distortion correction becomes insufficient and good image quality cannot be obtained. On the other hand, if falling below the lower limit, the second aspherical lens becomes large and the manufacturing cost increases.

The condition (5) is a conditional expression for defining the relationship between the distance from the intermediate imaging position to a surface on the magnification side of the third aspherical lens and the distance from the surface closest to the magnification side to the surface closest to the reduction side. When satisfying this condition, appropriate distortion correction can be realized and the size of the third aspherical lens can be reduced. If the condition exceeds the upper limit, the third aspherical lens becomes large and the manufacturing cost increases. On the other hand, if falling below the lower limit, the distortion correction becomes insufficient and good image quality cannot be obtained.

In addition to the conditions (3), (4), and (5), more advantageous effects can be obtained by further satisfying at least one of the following conditions (3A), (3B), (4A), (4B), (5A), and (5B):

$$D1/LT>0.06 \quad (3A)$$

$$D1/LT<0.12 \quad (3B)$$

$$D2/LT>0.08 \quad (4A)$$

$$D2/LT<0.13 \quad (4B)$$

$$D3/LT>0.02 \quad (5A)$$

$$D3/LT<0.07 \quad (5B).$$

Further, in the zoom lens system according to examples 1 to 3, at least one lens surface of the first aspherical lens, the second aspherical lens and the third aspherical lens may satisfy the following condition (6):

$$3<|H/h|<20 \quad (6)$$

where, h is a radius of the axial luminous flux LA on the lens surface, and H is a height from the optical axis to the main ray LFa of the most off-axis luminous flux LF on the lens surface. FIG. 16 exemplifies the radius h and the height H of the fourth lens element L4, which is an example of the first aspherical lens.

The condition (6) is a conditional expression for defining the relationship between the radius of the axial luminous flux on the lens surface and the height from the optical axis to the main ray of the most off-axis luminous flux on the lens surface. When satisfying this condition, the size of the aspherical lens can be reduced. If exceeding the upper limit, the aspherical lens becomes large and the manufacturing cost increases, and on the other hand, if falling below the lower limit, the distortion correction becomes insufficient and good image quality cannot be obtained.

In addition to the condition (6), more advantageous effects can be obtained by further satisfying at least one of the following conditions (6A) and (6B):

$$|H/h|>4 \quad (6A)$$

$$|H/h|<15 \quad (6B).$$

Further, the zoom lens system according to examples 1 to 3 may satisfy the following condition (7):

$$1<f\!f\!/fw<3 \quad (7)$$

where, ff is a focal length of the magnification optical system Op.

The condition (7) is a conditional expression for defining the relationship between the focal length of the magnification optical system Op and the focal length of the entire optical system at the wide-angle end. When satisfying this condition, a good wide-angle zoom lens can be realized. If exceeding the upper limit, the wide-angle lens is difficult to manufacture. On the other hand, if falling below the lower limit, the chromatic aberration of magnification becomes large and good image quality cannot be obtained.

Further, the zoom lens system according to examples 1 to 3 may satisfy the following condition (8):

$$2<fr/fw<4 \quad (8)$$

where, fr is a focal length of the relay optical system O1 at the wide-angle end.

The condition (8) is a conditional expression for defining the relationship between the focal length of the relay optical system O1 at the wide-angle end and the focal length of the entire optical system at the wide-angle end. When satisfying this condition, a compact zoom lens system can be realized. If exceeding the upper limit, the total length of the zoom lens system becomes long. On the other hand, if falling below the lower limit, the back focus becomes difficult to be secured.

Further, the zoom lens system according to examples 1 to 3 may satisfy the following condition (9):

$$5<fb/fw<30 \quad (9)$$

where, fb is a back focus of the entire optical system.

The condition (9) is a conditional expression for defining the relationship between the back focus of the entire optical system and the focal length of the entire optical system at the wide-angle end. When satisfying this condition, a compact zoom lens system can be realized. If exceeding the upper limit, the total length of the zoom lens system becomes long. On the other hand, if falling below the lower limit, the optical element P, such as prism, becomes difficult to be arranged between the zoom lens system and the original image S.

Further, the zoom lens system according to examples 1 to 3 may satisfy the following condition (10):

$$|\omega|>60 \quad (10)$$

where, ω is a maximum half angle of view at the wide-angle end.

The condition (10) is a conditional expression for defining the maximum half angle of view at the wide-angle end. When satisfying this condition, the distance from the zoom lens system to the magnification conjugate point on the magnification side can be shortened. If falling below the lower limit, the projection distance becomes long.

As described above, some examples have been described to exemplify the technology disclosed in the present application. The technology of the present disclosure, however, is not limited only to these examples, but also can be applied to other embodiments appropriately devised through modification, substitution, addition, omission and so on.

Hereinafter, numerical examples of the zoom lens system according to examples 1 to 3 are described. In each of the numerical examples, in the table, the unit of length is all "mm", and the unit of angle of view is all "°" (degree). Further, in each of the numerical examples, r is a radius of curvature, d is a surface interval, nd is a refractive index for d line, and vd is an Abbe number for d line. Further, in each of the numerical examples, a surface marked with "*" is aspherical, and the aspherical shape is defined by the following formula.

$$Z = \frac{h^2/r}{1+\sqrt{1-(1+\kappa)(h/r)^2}} + \sum A_n h^n \quad \text{[Mathematical Formula 1]}$$

where, Z is a distance from a point located on an aspherical surface at a height "h" from the optical axis, to the tangent plane of the aspherical vertex, h is a height from the optical axis, r is a radius of curvature of the vertex, K is a cone constant, and An is a nth-order aspherical coefficient.

Numerical Example 1

Regarding the zoom lens system of numerical example 1 (corresponding to example 1), Table 1 shows surface data, Table 2 shows various data, Table 3 shows single lens data, and Table 4 shows zoom lens group data.

TABLE 1

Surface data

| SURFACE NUMBER | r | d | nd | vd |
|---|---|---|---|---|
| Object plane | ∞ (infinity) | | | |
| 1 | 77.34930 | 4.50000 | 1.90366 | 31.3 |
| 2 | 45.21610 | 15.54530 | | |
| 3 | 117.26300 | 6.65440 | 1.72342 | 38.0 |
| 4 | 358.15200 | 1.20000 | | |
| 5 | 72.79170 | 2.50000 | 1.80420 | 46.5 |
| 6 | 20.93300 | 3.69320 | | |
| 7* | 22.79520 | 3.20000 | 1.80835 | 40.5 |
| 8* | 11.29660 | 7.77910 | | |
| 9 | 25.32140 | 5.30360 | 1.80610 | 33.3 |
| 10 | 240.19200 | 1.30620 | | |
| 11 | -87.96440 | 17.10360 | 1.61800 | 63.4 |
| 12 | -44.73120 | 0.20000 | | |
| 13 | 38.40530 | 5.96620 | 1.49700 | 81.6 |
| 14 | -37.23180 | 1.80010 | | |
| 15 | -22.39680 | 1.00000 | 1.86966 | 20.0 |
| 16 | 108.17440 | 0.52410 | | |
| 17 | 211.75400 | 8.97680 | 1.49700 | 81.6 |
| 18 | -20.55930 | 0.20000 | | |
| 19* | -38.20200 | 6.10260 | 1.68948 | 31.0 |
| 20* | -22.51550 | 4.53040 | | |
| 21 | 58.25460 | 12.51230 | 1.49700 | 81.6 |
| 22 | -108.64700 | 0.20000 | | |
| 23 | 120.60710 | 6.61210 | 1.92286 | 20.9 |
| 24 | -283.49830 | 0.20000 | | |
| 25 | 28.39740 | 8.67750 | 1.92286 | 20.9 |
| 26 | 47.71150 | 14.00170 | | |
| 27 | -53.43810 | 3.50000 | 1.80809 | 22.8 |
| 28 | 35.01350 | 4.32420 | | |
| 29* | 800.00000 | 3.00000 | 1.68948 | 31.0 |
| 30* | 21.53640 | 32.91160 | | |
| 31 | -115.34840 | 12.46100 | 1.83481 | 42.7 |
| 32 | -41.15160 | variable | | |
| 33 | 162.21670 | 6.03940 | 1.80610 | 33.3 |
| 34 | -242.79050 | 45.61900 | | |
| 35 | -39.78870 | 1.50000 | 1.73800 | 32.3 |
| 36 | 71.75740 | 2.89480 | | |
| 37 | 89.33900 | 7.61360 | 1.55032 | 75.5 |
| 38 | -34.19600 | variable | | |
| 39 | 26.14270 | 5.07360 | 1.59270 | 35.4 |
| 40 | 59.27580 | 0.20000 | | |
| 41 | 26.89050 | 1.50000 | 1.56883 | 56.0 |
| 42 | 18.73110 | 6.42050 | | |
| 43 (Aperture) | ∞ | 23.39950 | | |
| 44 | -26.43390 | 1.00000 | 1.73800 | 32.3 |
| 45 | 124.53550 | 0.20000 | | |
| 46 | 99.23070 | 5.80920 | 1.43700 | 95.1 |
| 47 | -31.39110 | variable | | |
| 48 | 47.40750 | 7.58560 | 1.49700 | 81.6 |

TABLE 1-continued

Surface data

| SURFACE NUMBER | r | d | nd | vd |
|---|---|---|---|---|
| 49 | −57.64980 | variable | | |
| 50 | 33.93880 | 1.50000 | 1.73800 | 32.3 |
| 51 | 23.36300 | 6.83800 | | |
| 52 | 30.15310 | 7.95990 | 1.43700 | 95.1 |
| 53 | −139.87240 | 12.70000 | | |
| 54 | ∞ | 25.00000 | 1.58913 | 61.3 |
| 55 | ∞ | 1.00000 | | |
| 56 | ∞ | 3.00000 | 1.50847 | 61.2 |
| 57 | ∞ | 1.00000 | | |
| Image plane | ∞ | | | |

Aspherical Data
7th Surface
K=0.00000E+00, A4=7.45268E−07, A6=−8.14203E−08, A8=2.53592E−11, A10=0.00000E+00
8th Surface
K=−7.80795E−01, A4=−7.49465E−06, A6=−1.35644E−07, A8=−7.05135E−10, A10=2.49786E−12
19th Surface
K=0.00000E+00, A4=3.09079E−06, A6=−7.38164E−08, A8=−1.02742E−11, A10=5.47438E−13
20th Surface
K=0.00000E+00, A4=2.18624E−05, A6=−4.25218E−09, A8=−1.01342E−10, A10=4.55335E−13
29th Surface
K=0.00000E+00, A4=6.98228E−05, A6=−1.75351E−07, A8=1.04081E−10, A10=0.00000E+00
30th Surface
K=0.00000E+00, A4=4.87896E−06, A6=−1.09352E−07, A8=2.38951E−11, A10=0.00000E+00

TABLE 2

Various data (object distance 900 mm)
Zoom ratio 1.06986

| | WIDE-ANGLE | INTERMEDIATE | TELEPHOTO |
|---|---|---|---|
| Focal length | −4.1306 | −4.2883 | −4.4191 |
| F number | −2.00008 | −2.01695 | −2.03294 |
| Angle of view | −70.0359 | −69.3594 | −68.7962 |
| Image height | 11.6200 | 11.6200 | 11.6200 |
| d32 | 61.2937 | 54.2046 | 48.5142 |
| d38 | 2.0915 | 9.1806 | 14.8710 |
| d47 | 4.2756 | 3.4209 | 2.6549 |
| d49 | 2.0000 | 2.8546 | 3.6206 |

Various data (object distance 600 mm)

| d4 | 1.0842 | 1.1054 | 1.1092 |
| d20 | 4.7027 | 4.7126 | 4.7250 |

Various data (object distance 2400 mm)

| d4 | 1.2951 | 1.2788 | 1.2956 |
| d20 | 4.2891 | 4.2620 | 4.2688 |

TABLE 3

Single lens data

| Lens element | First surface | Focal length |
|---|---|---|
| 1 | 1 | −129.0228 |
| 2 | 3 | 238.2406 |
| 3 | 5 | −37.3390 |
| 4 | 7 | −31.6403 |

TABLE 3-continued

Single lens data

| Lens element | First surface | Focal length |
|---|---|---|
| 5 | 9 | 34.7314 |
| 6 | 11 | 127.9376 |
| 7 | 13 | 39.0608 |
| 8 | 15 | −21.2602 |
| 9 | 17 | 38.1961 |
| 10 | 19 | 68.6316 |
| 11 | 21 | 78.2491 |
| 12 | 23 | 92.4095 |
| 13 | 25 | 62.5302 |
| 14 | 27 | −25.7222 |
| 15 | 29 | −32.1504 |
| 16 | 31 | 71.1946 |
| 17 | 33 | 121.4439 |
| 18 | 35 | −34.4860 |
| 19 | 37 | 45.9426 |
| 20 | 39 | 74.6552 |
| 21 | 41 | −116.2734 |
| 22 | 44 | −29.4638 |
| 23 | 46 | 55.3182 |
| 24 | 48 | 53.6293 |
| 25 | 50 | −108.1016 |
| 26 | 52 | 57.5831 |

TABLE 4

Zoom lens group data

| Group | First surface | Focal length |
|---|---|---|
| 1 | 1 | 15.88381 |
| 2 | 33 | 188.92723 |
| 3 | 39 | −232.06443 |
| 4 | 48 | 53.62930 |
| 5 | 50 | 110.51762 |

Numerical Example 2

Regarding the zoom lens system of numerical example 2 (corresponding to example 2), Table 5 shows surface data, Table 6 shows various data, Table 7 shows single lens data, and Table 8 shows zoom lens group data.

TABLE 5

Surface data

| SURFACE NUMBER | r | d | nd | vd |
|---|---|---|---|---|
| Object plane | ∞ (infinity) | | | |
| 1 | 104.62700 | 4.50000 | 1.90366 | 31.3 |
| 2 | 42.94220 | 10.76880 | | |
| 3 | 73.20870 | 9.34340 | 1.91000 | 31.0 |
| 4 | 249.15800 | 1.20000 | | |
| 5 | 74.07370 | 2.50000 | 1.80420 | 46.5 |
| 6 | 21.44620 | 3.15100 | | |
| 7* | 22.57270 | 3.20000 | 1.80835 | 40.5 |
| 8* | 11.63680 | 8.53740 | | |
| 9 | 23.88100 | 5.59080 | 1.74324 | 28.7 |
| 10 | 197.87540 | 1.33860 | | |
| 11 | −87.55730 | 16.53660 | 1.61800 | 63.4 |
| 12 | −57.90270 | 0.20000 | | |
| 13 | 39.99140 | 5.56540 | 1.49700 | 81.6 |
| 14 | −33.38760 | 1.67580 | | |
| 15 | −22.44700 | 1.00000 | 1.86966 | 20.0 |
| 16 | 145.35580 | 0.44940 | | |
| 17 | 233.67590 | 9.79910 | 1.49700 | 81.6 |
| 18 | −21.10770 | 0.20000 | | |
| 19* | −34.27240 | 5.43300 | 1.68948 | 31.0 |
| 20* | −21.87580 | 5.17070 | | |

TABLE 5-continued

Surface data

| SURFACE NUMBER | r | d | nd | vd |
|---|---|---|---|---|
| 21 | 65.38090 | 12.13310 | 1.49700 | 81.6 |
| 22 | −116.34960 | 0.20000 | | |
| 23 | 127.74670 | 7.38890 | 1.92286 | 20.9 |
| 24 | −203.51090 | 0.20000 | | |
| 25 | 27.53100 | 9.16490 | 1.92286 | 20.9 |
| 26 | 43.24100 | 14.18910 | | |
| 27 | −55.73370 | 3.50000 | 1.80809 | 22.8 |
| 28 | 31.01800 | 3.96970 | | |
| 29* | 800.00000 | 3.00000 | 1.68948 | 31.0 |
| 30* | 21.75780 | 32.92920 | | |
| 31 | −101.54270 | 12.73510 | 1.83481 | 42.7 |
| 32 | −39.86050 | variable | | |
| 33 | 145.65950 | 5.94140 | 1.80610 | 33.3 |
| 34 | −300.90060 | 44.74300 | | |
| 35 | −40.90780 | 1.50000 | 1.73731 | 32.8 |
| 36 | 64.75400 | 2.95170 | | |
| 37 | 80.00680 | 7.79350 | 1.55032 | 75.5 |
| 38 | −34.48870 | variable | | |
| 39 | 26.28390 | 5.03280 | 1.59270 | 35.4 |
| 40 | 60.40660 | 0.20000 | | |
| 41 | 27.34770 | 1.50000 | 1.56780 | 61.0 |
| 42 | 18.95370 | 5.88930 | | |
| 43 (Aperture) | ∞ | 23.45650 | | |
| 44 | −26.73160 | 1.00000 | 1.73800 | 32.3 |
| 45 | 114.60630 | 0.20000 | | |
| 46 | 95.55280 | 5.96380 | 1.43700 | 95.1 |
| 47 | −31.08780 | variable | | |
| 48 | 47.55700 | 7.60470 | 1.49700 | 81.6 |
| 49 | −59.42250 | variable | | |
| 50 | 34.60950 | 1.50000 | 1.73800 | 32.3 |
| 51 | 23.41500 | 6.11950 | | |
| 52 | 28.91530 | 8.36380 | 1.43700 | 95.1 |
| 53 | −150.81200 | 12.71060 | | |
| 54 | ∞ | 25.00000 | 1.58913 | 61.3 |
| 55 | ∞ | 1.00000 | | |
| 56 | ∞ | 3.00000 | 1.50847 | 61.2 |
| 57 | ∞ | 1.00000 | | |
| Image plane | ∞ | | | |

Aspherical Data

7th Surface
K=0.00000E+00, A4=3.30314E−06, A6=−7.32079E−08, A8=1.39601E−11, A10=0.00000E+00

8th Surface
K=−7.65051E−01, A4=4.05865E−06, A6=−1.41033E−07, A8=−6.94927E−10, A10=2.19005E−12

19th Surface
K=0.00000E+00, A4=7.31016E−06, A6=−7.89825E−08, A8=−8.76342E−12, A10=3.54858E−13

20th Surface
K=0.00000E+00, A4=2.21846E−05, A6=1.25182E−09, A8=−1.22389E−10, A10=4.47265E−13

29th Surface
K=0.00000E+00, A4=7.02002E−05, A6=−1.52154E−07, A8=6.11032E−11, A10=0.00000E+00

30th Surface
K=0.00000E+00, A4=7.16074E−06, A6=−1.07200E−07, A8=1.68867E−11, A10=0.00000E+00

TABLE 6

Various data (object distance 900 mm)
Zoom ratio 1.07013

| | WIDE-ANGLE | INTERMEDIATE | TELEPHOTO |
|---|---|---|---|
| Focal length | −4.1301 | −4.2892 | −4.4197 |
| F number | −2.00011 | −2.01616 | −2.03116 |
| Angle of view | −70.2197 | −69.5177 | −68.9444 |

TABLE 6-continued

Various data (object distance 900 mm)
Zoom ratio 1.07013

| | WIDE-ANGLE | INTERMEDIATE | TELEPHOTO |
|---|---|---|---|
| Image height | 11.6200 | 11.6200 | 11.6200 |
| d32 | 63.7179 | 56.5359 | 50.8358 |
| d38 | 2.0025 | 9.1845 | 14.8846 |
| d47 | 4.2386 | 3.4151 | 2.6847 |
| d49 | 2.0000 | 2.8234 | 3.5538 |
| Various data object distance 600 mm) | | | |
| d4 | 1.1309 | 1.1831 | 1.1942 |
| d20 | 5.3409 | 5.3943 | 5.4157 |
| Various data (object distance 2400 mm) | | | |
| d4 | 1.2278 | 1.2158 | 1.2155 |
| d20 | 4.9028 | 4.8750 | 4.8713 |

TABLE 7

Single lens data

| Lens element | First surface | Focal length |
|---|---|---|
| 1 | 1 | −83.4933 |
| 2 | 3 | 111.1111 |
| 3 | 5 | −38.3471 |
| 4 | 7 | −34.1857 |
| 5 | 9 | 36.0472 |
| 6 | 11 | 228.0626 |
| 7 | 13 | 37.5579 |
| 8 | 15 | −22.2966 |
| 9 | 17 | 39.4558 |
| 10 | 19 | 74.4086 |
| 11 | 21 | 86.1328 |
| 12 | 23 | 85.9627 |
| 13 | 25 | 64.1505 |
| 14 | 27 | −24.2233 |
| 15 | 29 | −32.4902 |
| 16 | 31 | 71.8541 |
| 17 | 33 | 122.4841 |
| 18 | 35 | −33.7982 |
| 19 | 37 | 44.8766 |
| 20 | 39 | 74.4197 |
| 21 | 41 | −116.2808 |
| 22 | 44 | −29.2830 |
| 23 | 46 | 54.4556 |
| 24 | 48 | 54.4556 |
| 25 | 50 | −104.0087 |
| 26 | 52 | 56.3193 |

TABLE 8

Zoom lens group data

| Group | First surface | Focal length |
|---|---|---|
| 1 | 1 | 16.29395 |
| 2 | 33 | 190.19837 |
| 3 | 39 | −237.18972 |
| 4 | 48 | 54.43561 |
| 5 | 50 | 110.84756 |

Numerical Example 3

Regarding the zoom lens system of numerical example 3 (corresponding to example 3), Table 9 shows surface data, Table 10 shows various data, Table 11 shows single lens data, and Table 12 shows zoom lens group data.

TABLE 9

Surface data

| SURFACE NUMBER | r | d | nd | vd |
|---|---|---|---|---|
| Object plane | ∞ (infinity) | | | |
| 1 | 67.72900 | 4.50000 | 1.90766 | 33.4 |
| 2 | 48.23100 | 20.26560 | | |
| 3 | 296.96530 | 3.79420 | 1.48700 | 70.4 |
| 4 | 757.84560 | 1.20000 | | |
| 5 | 80.37910 | 2.50000 | 1.65513 | 56.5 |
| 6 | 22.89090 | 3.81410 | | |
| 7* | 23.36160 | 3.20000 | 1.80835 | 40.5 |
| 8* | 11.47250 | 9.79350 | | |
| 9 | 25.46550 | 6.81650 | 1.68610 | 32.8 |
| 10 | −492.65840 | 1.17330 | | |
| 11 | −65.83780 | 15.61150 | 1.61800 | 63.4 |
| 12 | −50.50900 | 0.23400 | | |
| 13 | 44.60560 | 6.55580 | 1.49700 | 81.6 |
| 14 | −33.48910 | 1.09440 | | |
| 15 | −25.11970 | 1.00000 | 1.86966 | 20.0 |
| 16 | 74.55790 | 0.20000 | | |
| 17 | 73.09310 | 10.65550 | 1.49700 | 81.6 |
| 18 | −23.21680 | 0.20000 | | |
| 19* | −30.94380 | 4.62730 | 1.68948 | 31.0 |
| 20* | −21.78970 | 6.40270 | | |
| 21 | 114.84090 | 10.75840 | 1.49700 | 81.6 |
| 22 | −72.59060 | 0.33060 | | |
| 23 | 63.48110 | 8.80510 | 1.92286 | 20.9 |
| 24 | 2710.37010 | 0.20000 | | |
| 25 | 29.39080 | 8.69560 | 1.92286 | 20.9 |
| 26 | 49.24280 | 13.60360 | | |
| 27 | −54.07920 | 3.49830 | 1.80809 | 22.8 |
| 28 | 36.31770 | 3.20610 | | |
| 29* | −158.35800 | 3.00000 | 1.68948 | 31.0 |
| 30* | 22.61390 | 32.52010 | | |
| 31 | −96.73840 | 12.74580 | 1.83481 | 42.7 |
| 32 | −39.32820 | variable | | |
| 33 | 141.22990 | 5.96250 | 1.80610 | 33.3 |
| 34 | −295.75400 | 43.37880 | | |
| 35 | −40.43550 | 1.50000 | 1.73605 | 34.3 |
| 36 | 57.39630 | 3.04090 | | |
| 37 | 71.05550 | 7.85480 | 1.55032 | 75.5 |
| 38 | −33.58810 | variable | | |
| 39 | 26.37530 | 4.84900 | 1.59270 | 35.4 |
| 40 | 64.56880 | 0.20050 | | |
| 41 | 27.89350 | 1.50000 | 1.56386 | 64.2 |
| 42 | 18.83680 | 5.08030 | | |
| 43 (Aperture) | ∞ | 23.71790 | | |
| 44 | −25.78560 | 1.00000 | 1.73800 | 32.3 |
| 45 | 128.94460 | 0.20040 | | |
| 46 | 116.78010 | 7.15730 | 1.43700 | 95.1 |
| 47 | −28.60800 | variable | | |
| 48 | 46.85870 | 7.72160 | 1.49700 | 81.6 |
| 49 | −58.83810 | variable | | |
| 50 | 35.69560 | 1.50000 | 1.73800 | 32.3 |
| 51 | 23.31630 | 3.70470 | | |
| 52 | 27.53510 | 8.42930 | 1.43700 | 95.1 |
| 53 | −183.47360 | 12.73480 | | |
| 54 | ∞ | 25.00000 | 1.58913 | 61.3 |
| 55 | ∞ | 1.00000 | | |
| 56 | ∞ | 3.00000 | 1.50847 | 61.2 |
| 57 | ∞ | 1.00000 | | |
| Image plane | ∞ | | | |

Aspherical Data
7th Surface
K=0.00000E+00, A4=5.19763E−06, A6=−6.75733E−08, A8=4.18012E−12, A10=0.00000E+00
8th Surface
K=−7.63598E−01, A4=1.18447E−05, A6=−1.39962E−07, A8=−7.13018E−10, A10=1.87538E−12
19th Surface
K=0.00000E+00, A4=1.08134E−05, A6=−7.71514E−08, A8=−2.05883E−11, A10=3.01391E−13
20th Surface
K=0.00000E+00, A4=2.44198E−05, A6=3.33154E−09, A8=−1.31420E−10, A10=4.31940E−13
29th Surface
K=0.00000E+00, A4=7.19251E−05, A6=−1.28530E−07, A8=3.19380E−11, A10=0.00000E+00
30th Surface
K=0.00000E+00, A4=1.13193E−05, A6=−1.01109E−07, A8=2.22287E−11, A10=0.00000E+00

TABLE 10

Zoom ratio 1.06981

| | WIDE-ANGLE | INTERMEDIATE | TELEPHOTO |
|---|---|---|---|
| Various data (object distance 900 mm) | | | |
| Focal length | −4.1464 | −4.3013 | −4.4358 |
| F number | −2.00007 | −2.01408 | −2.02811 |
| Angle of view | −69.9871 | −69.3158 | −68.7296 |
| Image height | 11.6200 | 11.6200 | 11.6200 |
| Lens total length | 440.0169 | 440.0221 | 440.0227 |
| d32 | 61.2214 | 54.2023 | 48.2602 |
| d38 | 2.0006 | 9.0197 | 14.9618 |
| d47 | 4.2432 | 3.4482 | 2.6979 |
| d49 | 2.0000 | 2.7948 | 3.5452 |
| Various data (object distance 600 mm) | | | |
| d4 | 1.1118 | 1.2004 | 1.3824 |
| d20 | 6.6151 | 6.6280 | 6.6634 |
| Various data (object distance 2400 mm) | | | |
| d4 | 0.8516 | 1.1077 | 1.2447 |
| d20 | 6.0465 | 6.0915 | 6.1161 |

TABLE 11

Single lens data

| Lens element | First surface | Focal length |
|---|---|---|
| 1 | 1 | −207.3515 |
| 2 | 3 | 999.9999 |
| 3 | 5 | −49.7098 |
| 4 | 7 | −31.7019 |
| 5 | 9 | 35.4819 |
| 6 | 11 | 252.7247 |
| 7 | 13 | 39.5907 |
| 8 | 15 | −21.5049 |
| 9 | 17 | 36.8050 |
| 10 | 19 | 88.5596 |
| 11 | 21 | 91.2297 |
| 12 | 23 | 70.3248 |
| 13 | 25 | 65.2752 |
| 14 | 27 | −26.4295 |
| 15 | 29 | −28.5072 |
| 16 | 31 | 72.0998 |
| 17 | 33 | 119.3042 |
| 18 | 35 | −32.0219 |
| 19 | 37 | 42.5776 |
| 20 | 39 | 71.8364 |
| 21 | 41 | −109.4228 |
| 22 | 44 | −29.0375 |
| 23 | 46 | 53.3821 |
| 24 | 48 | 53.7893 |
| 25 | 50 | −96.0423 |
| 26 | 52 | 55.4607 |

TABLE 12

Zoom lens group data

| Group | First surface | Focal length |
|---|---|---|
| 1 | 1 | 16.40449 |
| 2 | 33 | 184.46354 |
| 3 | 39 | −256.09602 |

TABLE 12-continued

Zoom lens group data

| Group | First surface | Focal length |
|---|---|---|
| 4 | 48 | 53.78933 |
| 5 | 50 | 122.88119 |

Table 13 below shows the corresponding values of the respective conditional expressions in the respective numerical examples.

TABLE 13

| Condition | Example 1 | Example 2 | Example 3 |
|---|---|---|---|
| (1) | 57.7 | 26.9 | 241.2 |
| (2) | 0.54 | 0.75 | 0.21 |
| (3) | 0.086 | 0.079 | 0.091 |
| (4) | 0.097 | 0.102 | 0.104 |
| (5) | 0.040 | 0.039 | 0.035 |
| (6) | 5.2-11.4 | 5.4-11.8 | 5.3-12.6 |
| (7) | 1.982 | 2.046 | 2.091 |
| (8) | 3.380 | 3.174 | 2.979 |
| (9) | 10.33748 | 10.3413 | 10.30648 |
| (10) | 70.04 | 70.22 | 69.66 |

Second Embodiment

Figure 17:
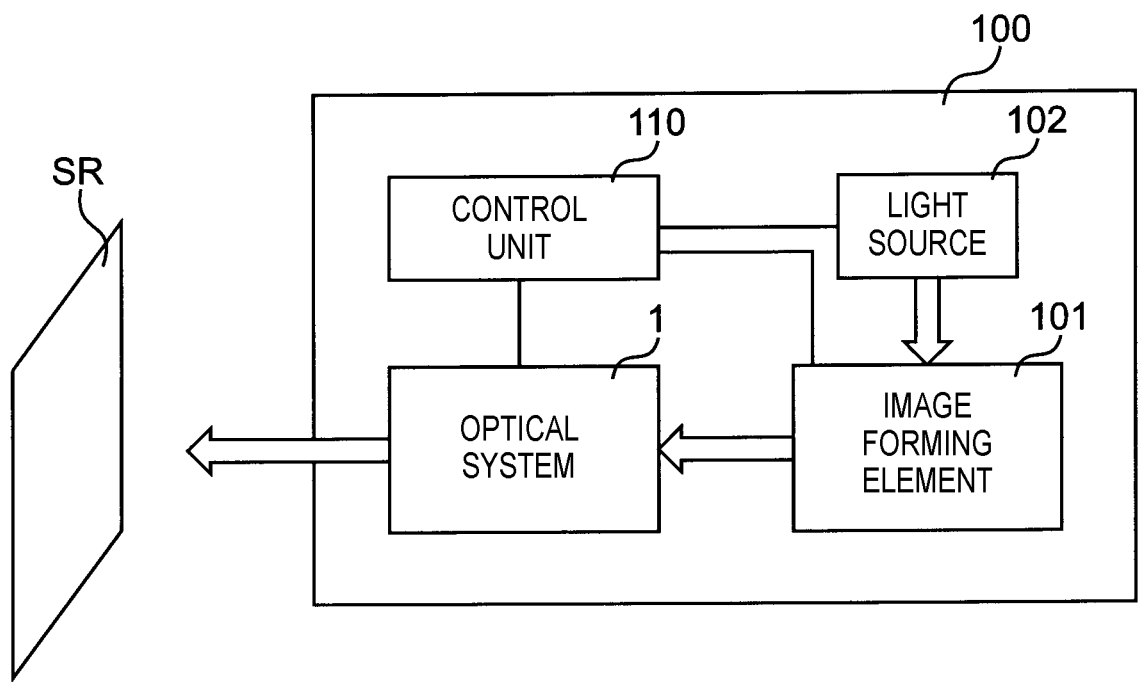
FIG. 17 is a block diagram showing an example of an image projection apparatus according to the present disclosure.

Hereinafter, a second embodiment of the present disclosure is described with reference to FIG. 17. FIG. 17 is a block diagram showing an example of the image projection apparatus according to the present disclosure. The image projection apparatus 100 includes such an optical system 1 as disclosed in the first embodiment, an image forming element 101, a light source 102, a control unit 110, and others. The image forming element 101 is constituted of, for example, liquid crystal or DMD, for generating an image to be projected through the optical system 1 onto a screen SR. The light source 102 is constituted of such as a light emitting diode (LED) or a laser, and supplies light to the image forming element 101. The control unit 110 is constituted of, for example, central processing unit (CPU) or micro-processing unit (MPU), for controlling the entire apparatus and respective components. The optical system 1 may be configured as an interchangeable lens that can be detachably attached to the image projection apparatus 100. In this case, an apparatus in which the optical system 1 is removed from the image projection apparatus 100 is an example of a main body apparatus.

The image projection apparatus 100 described above can realize a wide-angle zoom function while reducing costs by employing the optical system 1 according to the first embodiment.

Third Embodiment

Figure 18:
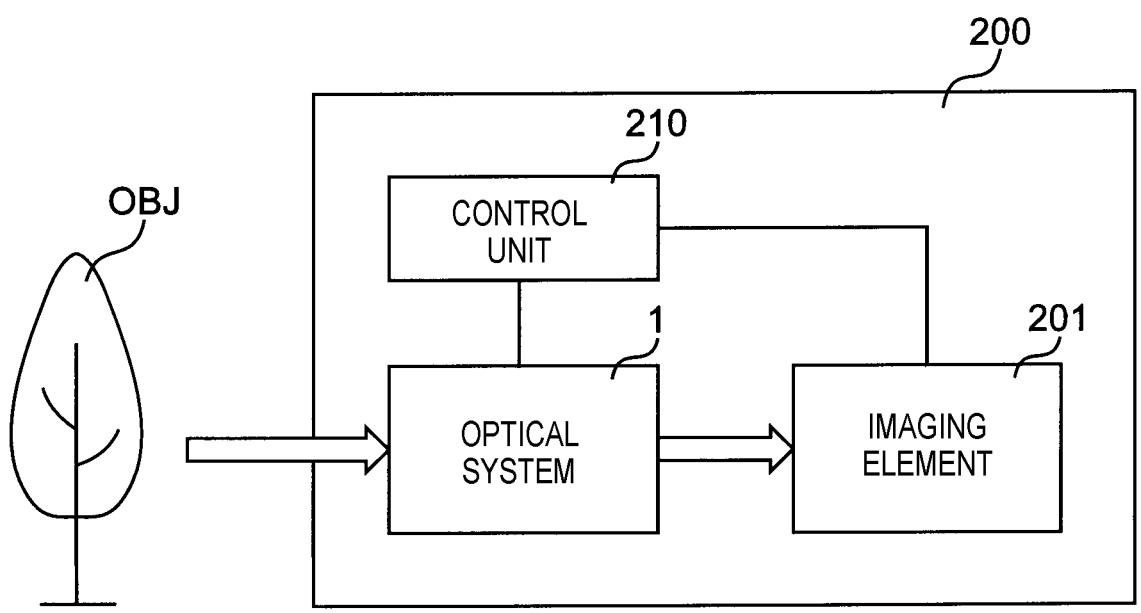
FIG. 18 is a block diagram showing an example of an imaging apparatus according to the present disclosure.

Hereinafter, a third embodiment of the present disclosure is described with reference to FIG. 18. FIG. 18 is a block diagram showing an example of the imaging apparatus according to the present disclosure. The imaging apparatus 200 includes such an optical system 1 as disclosed in the first embodiment, an imaging element 201, a control unit 210, and others. The imaging element 201 is constituted of, for example, a charge coupled device (CCD) image sensor or a complementary metal oxide semiconductor (CMOS) image sensor, for receiving an optical image of an object OBJ formed by the optical system 1 to convert the image into an electrical image signal. The control unit 110 is constituted of, for example, a CPU or an MPU, for controlling the entire apparatus and respective components. The optical system 1 may be configured as an interchangeable lens that can be detachably attached to the imaging apparatus 200. In this case, an apparatus in which the optical system 1 is removed from the imaging apparatus 200 is an example of a main body apparatus.

The imaging apparatus 200 described above can realize a wide-angle zoom function while reducing costs by employing the optical system 1 according to the first embodiment.

As described above, the embodiments have been described to disclose the technology in the present disclosure. To that end, the accompanying drawings and detailed description are provided.

Therefore, among the components described in the accompanying drawings and the detailed description, not only the components that are essential for solving the problem, but also the components that are not essential for solving the problem may also be included in order to exemplify the above-described technology. Therefore, it should not be directly appreciated that the above non-essential components are essential based on the fact that the non-essential components are described in the accompanying drawings and the detailed description.

Further, the above-described embodiments have been described to exemplify the technology in the present disclosure. Thus, various modification, substitution, addition, omission and so on can be made within the scope of the claims or equivalents thereof.

INDUSTRIAL APPLICABILITY

The present disclosure can be applied to image projection apparatuses such as projectors and head-up displays, and imaging apparatuses such as digital still cameras, digital video cameras, surveillance cameras in surveillance systems, web cameras, and onboard cameras. In particular, the present disclosure can be applied to optical systems that require a high image quality, such as projectors, digital still camera systems, and digital video camera systems.

The invention claimed is:

1. An optical system internally having an intermediate imaging position that is conjugated to a magnification conjugate point on a magnification side and a reduction conjugate point on a reduction side, respectively, the optical system comprising:
a magnification optical system having a plurality of lens elements positioned on the magnification side with respect to the intermediate imaging position;
a relay optical system having a plurality of lens elements positioned on the reduction side with respect to the intermediate imaging position;
a spherical lens positioned first from the magnification side of the magnification optical system;
a first aspherical lens arranged in the magnification optical system;
a second aspherical lens arranged in the magnification optical system; and
a third aspherical lens arranged in the relay optical system,
wherein the magnification optical system includes: (i) a front group positioned on the magnification side with respect to an intersection position where a main ray of a furthest off-axis luminous flux is to intersect with an optical axis; and (ii) a rear group positioned on an intermediate imaging position side with respect to the intersection position, wherein the first aspherical lens is arranged in the front group, wherein the second aspherical lens is arranged in the rear group, wherein the optical system satisfies:

$0.04<D1/LT<0.15;$ $0.04<D2/LT<0.15;$ and $0.01<D3/LT<0.07,$ wherein LT is a distance from a surface on the magnification side of the spherical lens to a surface on the reduction side of the lens element which is positioned first from the reduction side, wherein D1 is a distance from the surface on the magnification side of the spherical lens to a surface on the magnification side of the first aspherical lens, wherein D2 is a distance from the intermediate imaging position to a surface on the reduction side of the second aspherical lens, and wherein D3 is a distance from the intermediate imaging position to a surface on the magnification side of the third aspherical lens.

2. The optical system according to claim 1, wherein:

at least one lens surface of the first aspherical lens, the second aspherical lens or the third aspherical lens satisfies $3<|H/h|<20;$ and:

h is a radius of an axial luminous flux on the at least one lens surface, and H is a height from the optical axis to the main ray of the furthest off-axis luminous flux on the at least one lens surface.

3. The optical system according to claim 1, wherein:

the optical system satisfies $1<ff/fw<3;$ and ff is a focal length of the magnification optical system, and fw is a focal length of an entirety of the optical system at a wide-angle end.

4. The optical system according to claim 1, wherein:

the optical system satisfies $2<fr/fw<4;$ and fr is a focal length of the relay optical system at a wide-angle end, and fw is a focal length of an entirety of the optical system at the wide-angle end.

5. The optical system according to claim 1, wherein:

the optical system satisfies $5<fb/fw<30;$ and fb is a back focus of an entirety of the optical system, and fw is a focal length of the entirety of the optical system at a wide-angle end.

6. The optical system according to claim 1, wherein:

the optical system satisfies $|\omega|>60;$ and $\omega$ is a maximum half angle of view at a wide-angle end.

7. The optical system according to claim 1, wherein:

the plurality of lens elements of the magnification optical system includes a first lens element and a second lens element in this order from the magnification side, and the second lens element has a positive power;

the optical system satisfies $23<|f2/fw|<1000;$ and f2 is a focal length of the second lens element, and fw is a focal length of an entirety of the optical system at a wide-angle end.

8. The optical system according to claim 7, wherein:

the optical system satisfies $0<|f1/f2|<1;$ and f1 is a focal length of the first lens element.

9. An image projection apparatus comprising:

the optical system according to claim 1; and an image forming element configured to generate an image to be projected through the optical system onto a screen.

10. An imaging apparatus comprising:

the optical system according to claim 1; and an imaging element configured to receive an optical image formed by the optical system so as to convert the optical image into an electrical image signal.

* * * * *